(12) United States Patent
Imamura et al.

(10) Patent No.: US 11,205,166 B2
(45) Date of Patent: Dec. 21, 2021

(54) WIRELESS READING SYSTEM, SHOPPING ASSISTANCE SYSTEM WITH THE SAME, WIRELESS READING METHOD AND SHOPPING ASSISTANCE METHOD

(71) Applicant: Panasonic Intellectual Property Management Co., Ltd., Osaka (JP)

(72) Inventors: Koji Imamura, Tokyo (JP); Atsushi Maruyama, Kanagawa (JP); Shinichi Okada, Tokyo (JP); Motoo Nakagawa, Tokyo (JP); Masahiro Kumagawa, Tokyo (JP); Shinsuke Ogata, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 409 days.

(21) Appl. No.: 16/234,944

(22) Filed: Dec. 28, 2018

(65) Prior Publication Data

US 2019/0213572 A1 Jul. 11, 2019

(30) Foreign Application Priority Data

Jan. 9, 2018 (JP) .............................. JP2018-001513

(51) Int. Cl.
*G06Q 20/20* (2012.01)
*G06K 7/10* (2006.01)

(52) U.S. Cl.
CPC ....... *G06Q 20/208* (2013.01); *G06K 7/10009* (2013.01); *G06K 7/10366* (2013.01)

(58) Field of Classification Search
None
See application file for complete search history.

(56) References Cited

U.S. PATENT DOCUMENTS

| 8,448,857 B2 * | 5/2013 | Davis ................. G06Q 30/0603 235/383 |
| 2007/0069018 A1 * | 3/2007 | Dearing ............. G06K 7/10336 235/385 |
| 2010/0164687 A1 * | 7/2010 | Perng .................. G06K 7/0008 340/10.1 |
| 2010/0288837 A1 | 11/2010 | Tomiyama et al. |

(Continued)

FOREIGN PATENT DOCUMENTS

| JP | 2000-105872 A | 4/2000 |
| JP | 4938049 B2 | 5/2012 |
| JP | 2016-162177 A | 9/2016 |

OTHER PUBLICATIONS

Japanese Office Action issued in Japanese Patent Application No. 2018-001513 dated Oct. 5, 2021.

*Primary Examiner* — Allen C Chein
(74) *Attorney, Agent, or Firm* — Pearne & Gordon LLP

(57) ABSTRACT

A wireless reading system includes a goods path and a reader device. The goods path allows one or more goods held by a customer passing through a customer path to be moved along. The reader device is configured to perform wireless communication, whose medium is radio waves, with one or more electronic tags attached to the one or more goods while the one or more goods are moved along the goods path, thereby reading one or more pieces of goods information on the one or more goods, respectively.

18 Claims, 12 Drawing Sheets

(56) References Cited

U.S. PATENT DOCUMENTS

| | | | |
|---|---|---|---|
| 2014/0027511 A1* | 1/2014 | Plocher | G06Q 20/10 235/439 |
| 2015/0041535 A1* | 2/2015 | Daily | A47F 9/047 235/381 |
| 2020/0019949 A1* | 1/2020 | Simmons | G08B 13/246 |

* cited by examiner

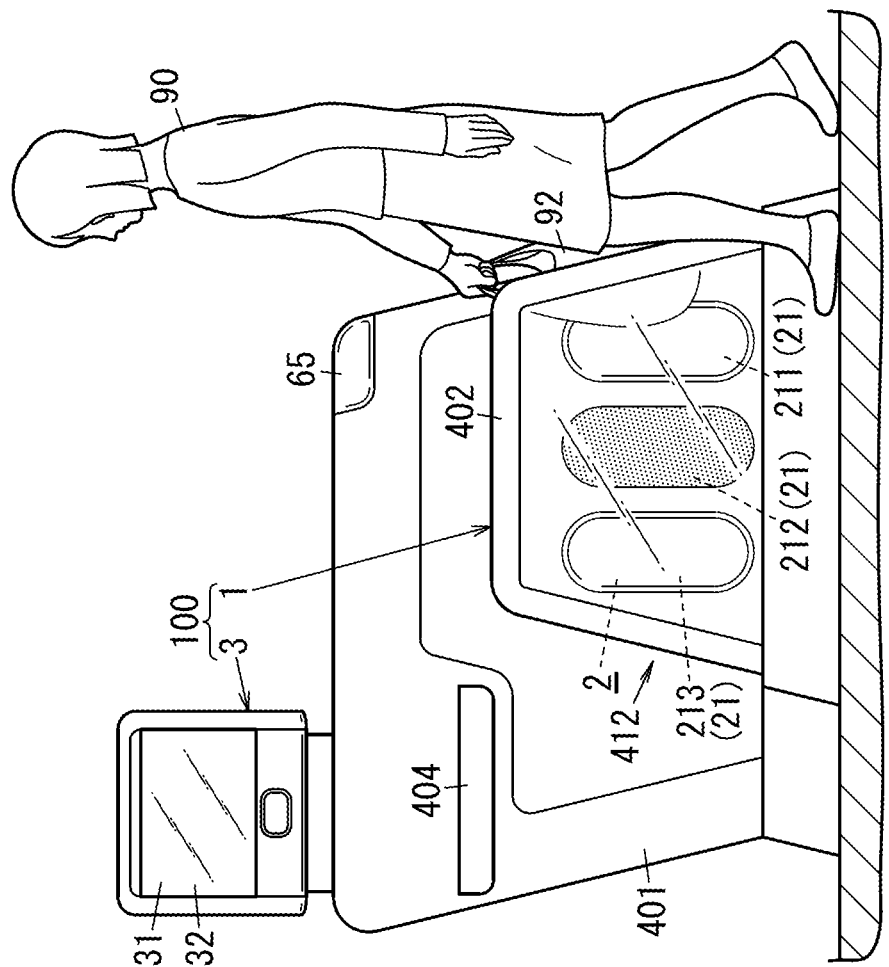
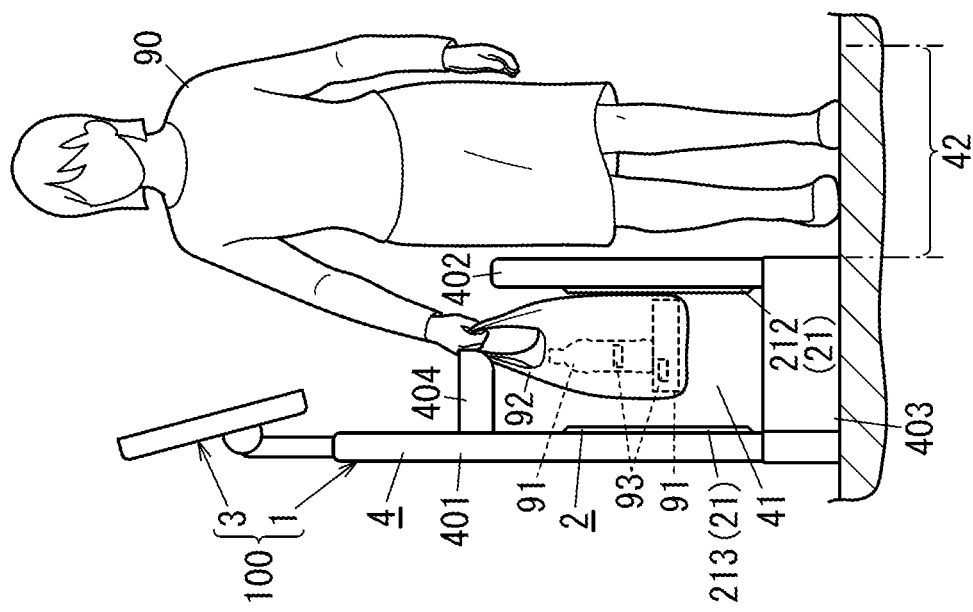

WIRELESS READING SYSTEM, SHOPPING ASSISTANCE SYSTEM WITH THE SAME, WIRELESS READING METHOD AND SHOPPING ASSISTANCE METHOD

CROSS REFERENCE TO RELATED APPLICATION

This application claims the benefit and priority of Japanese Patent Application No. 2018-1513, filed on Jan. 9, 2018, the entire contents of which is incorporated herein by reference.

TECHNICAL FIELD

The invention relates generally to wireless reading systems and shopping assistance systems with the same and, more particularly, to a wireless reading system configured to perform wireless communication with an electronic tag(s) to read information on goods, a shopping assistance system with the same, a wireless reading method and a shopping assistance method.

BACKGROUND ART

Document 1 (JP 2016-162177 A) describes a radio frequency (RF) tag (electronic tag) reading device provided for a point of sales (POS) device for performing at least a checkout (settlement) process of goods to be purchased by each customer. Electronic tags are attached to goods and store respective pieces of price or identification information on the goods with the electronic tags.

The reading device of Document 1 reads respective pieces of information from electronic tags with goods put in a housing with six faces that constitute a box shaped storage chamber. The housing is formed with an opening communicating with the storage chamber. A lid for opening and closing the opening is provided. That is, with the lid opened, each customer is allowed to put goods in the storage chamber from the opening. The housing and the lid are made of material that reflects radio waves or material that absorbs radio waves to prevent the reading device from reading respective pieces of information from electronic tags outside the storage chamber.

However, the configuration described in Document 1 requires each customer to put goods in the storage chamber to close the lid and then to open the lid to take the goods out from the storage chamber after respective pieces of information on the goods have been read. For example, an unfamiliar customer using the reading device may cause the occurrence of a long queue as a result of an increase in one customer's reading device usage time, thereby increasing customers' waiting time for purchasing goods.

SUMMARY

The present disclosure has been achieved in view of the above circumstances, and an object thereof is to provide a wireless reading system capable of reducing customers' waiting time for purchasing goods, a shopping assistance system with the same, a wireless reading method and a shopping assistance method.

A wireless reading system according to an aspect of the present disclosure includes a goods path and a reader device. The goods path allows one or more goods held by a customer passing through a customer path to be moved along. The reader device is configured to perform wireless communication, whose medium is radio waves, with one or more electronic tags attached to the one or more goods while the one or more goods are moved along the goods path, thereby reading one or more pieces of goods information on the one or more goods, respectively.

A shopping assistance system according to an aspect of the present disclosure includes the wireless reading system, and a checkout system configured to perform a checkout process based on the one or more pieces goods information.

A wireless reading method according to an aspect of the present disclosure includes a movement step and a reading step. The movement step is a step of allowing one or more goods held by a customer passing through a customer path to be moved along a goods path. The reading step is a step of, while the one or more goods are moved along the goods path in the movement step, performing wireless communication, whose medium is radio waves, with one or more electronic tags attached to the one or more goods, thereby reading one or more pieces goods information on the one or more goods, respectively.

A shopping assistance method according to an aspect of the present disclosure includes a check-in step, a movement step, a reading step and a checkout step. The check-in step is a step of specifying a settlement source. The movement step is a step of allowing one or more goods held by a customer passing through a customer path to be moved along a goods path after the check-in step. The reading step is a step of, while the one or more goods are moved along the goods path in the movement step, performing wireless communication, whose medium is radio waves, with one or more electronic tags attached to the one or more goods, thereby reading one or more pieces goods information on the one or more goods, respectively. The checkout step is a step of performing a checkout based on the settlement source that has been specified in the check-in step, and the one or more pieces goods information read through the reading step.

BRIEF DESCRIPTION OF THE DRAWINGS

FIG. 1A is a front view illustrating a schematic configuration of a shopping assistance system according to Embodiment 1;

FIG. 1B is a right side view illustrating the schematic configuration of the shopping assistance system;

DETAILED DESCRIPTION

Embodiment 1

(1) Schema

A shopping assistance system according to the present embodiment is a system, for assisting customers' purchase of goods (i.e., "shopping"), which is introduced to retail stores. Examples thereof include convenience stores, supermarkets, department stores, drugstores, clothing stores, electronics retail stores, home centers (hardware stores) and the like.

Figure 2:
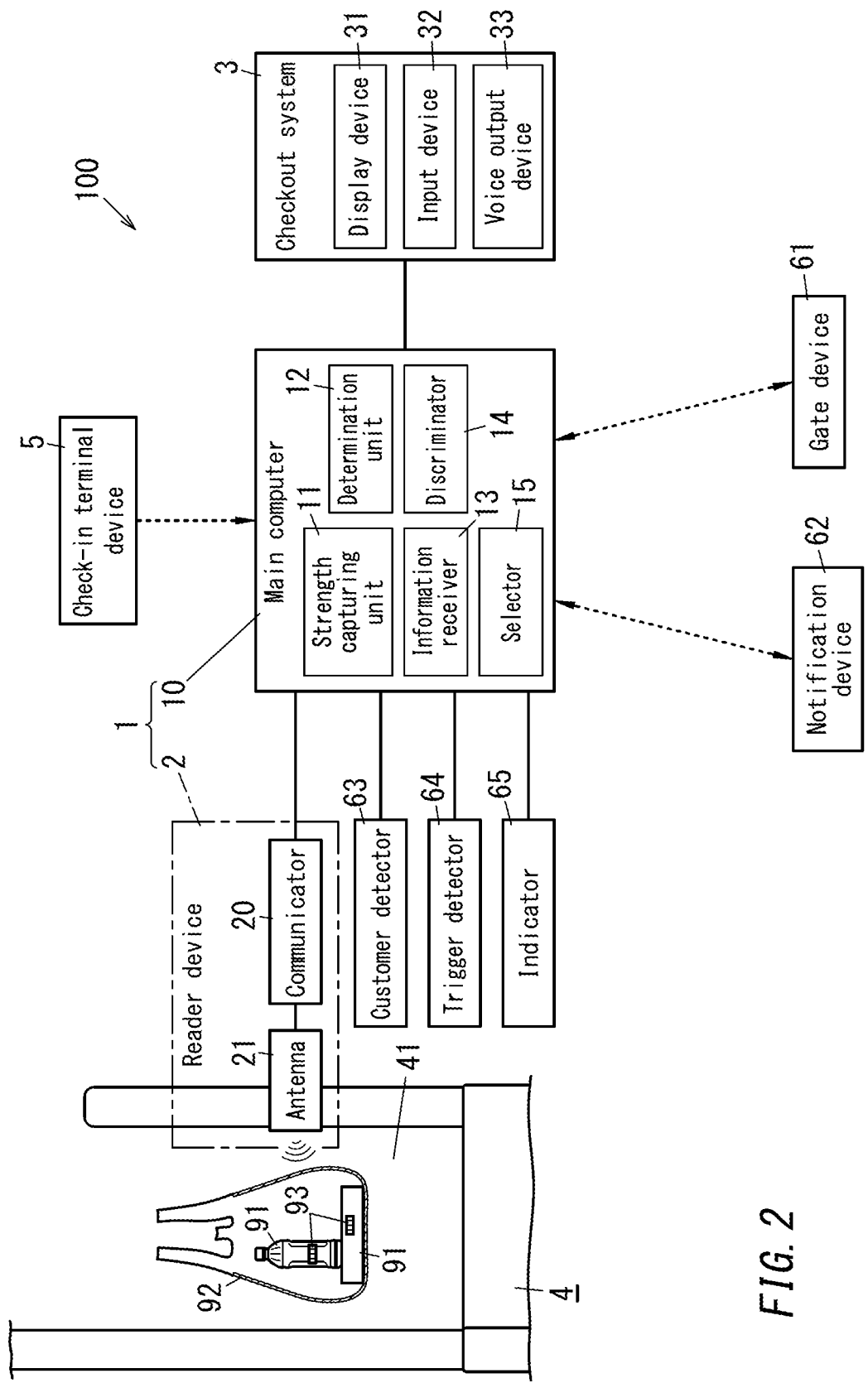
FIG. 2 is a view illustrating the schematic configuration of the shopping assistance system.

As shown in FIGS. 1A to 2, a shopping assistance system 100 is equipped with a wireless reading system 1 and a checkout system 3. The wireless reading system 1 is configured to perform wireless communication with one or more electronic tags 93 attached to one or more goods (or products) 91, thereby reading one or more pieces of goods information (or product information) on the one or more goods, respectively. The checkout system 3 is configured to perform a checkout process based on the one or more pieces of goods information read through the wireless reading system 1.

As shown in FIGS. 1A and 1B, the wireless reading system 1 includes a goods path 41 and a reader device 2. The goods path 41 is a path that allows goods held by each customer 90 passing through a customer path 42 to be moved along. The reader device 2 is configured to, while one or more goods 91 are moved along the goods path 41, perform wireless communication, whose medium is radio waves, with one or more electronic tags 93 attached to the one or more goods 91, thereby reading one or more pieces of goods information on the one or more goods 91, respectively. The "path" stated in the present disclosure is a space as a "pathway" of an object(s), and means a space separated from surrounding space by, for example, structure, lines drawn on a floor, or the like. Here, examples of the structure include a wall(s), a pillar(s), a string(s), a net(s) and the like.

That is, the goods path 41 in the present embodiment is a space separated from surrounding space to possess only a width that allows at least goods 91 to be moved along the path. Similarly, the customer path 42 is a space separated from surrounding space to possess only a width that allows at least a customer 90 to pass through the path.

The "goods information" stated in the present disclosure is information for identifying a corresponding item of goods (or product) and is, for example goods identification code. Here, examples thereof include a Japanese article number (JAN) code in Japan, a European article number (EAN) code in Europe and the like, and a universal product code (UPC) in U.S.A. and the like. One or more pieces of goods information read through the reader device 2 are to be used for, e.g., a checkout process by the checkout system 3. The goods information is not limited to information for identifying a type (kind) of a corresponding item of goods 91 (or product), but may contain information such as serial information for individually identifying a corresponding item of same type goods 91. It is accordingly possible to, even in the case of the same type goods 91, specify each item of the same type goods 91 based on their respective pieces of goods information. Each of the electronic tags 93 is a radio frequency (RF) tag. The reader device 2 is not to directly read one or more pieces of goods information from one or more goods 91, respectively, but read the one or more pieces of goods information from one or more electronic tags 93 attached to the one or more goods 91 in a contactless manner, respectively.

With the shopping assistance system 100, the reader device 2 installed in, for example a store 8 (see FIG. 3) reads goods information from goods 91 to be purchased in a contactless manner, thereby enabling the checkout of the goods 91. This therefore enables reading of; two or more pieces of goods information from two or more goods 91 together; and also their respective pieces of goods information even with the goods 91 put in a container 92. It is therefore possible for store clerks and customers 90 to save labor and time needed for their shopping as compared with one or more pieces of goods information being acquired by reading respective corresponding bar codes or the like.

The "container" stated in the present disclosure is a container used for each customer 90 to take its own goods 91 home, and needs to have an opening that allows goods 91 to pass through. Examples thereof include a sack, a basket, a box, a bag (reusable shopping bag and the like), and the like. Here, materials of such bags, baskets, boxes and bags are not limited in particular. Examples of the sacks/bags include "plastic bags" such as bags made from polyethylene and bags made from polypropylene, and "paper bags" such as bags made of paper. Although details will be described later, in the present embodiment customers 90 are to take their respective containers 92 when entering the store and then, whenever picking up (choosing) each item of goods 91 to be purchased, put it in their own containers 92. The wireless reading system 1 is therefore to read one or more pieces of goods information on one or more goods 91 put in a target container 92 as shown in FIG. 1B and the like.

The goods "to be purchased" stated in the present disclosure mean goods 91 to be purchased by a customer 90. The "purchase" stated in the present disclosure means an act of a buyer (customer) in a process of a transfer of the ownership of goods 91 from a seller (store) to the buyer and payment (purchase and sale) from the buyer to the seller to pay for the goods 91 (charge). Basically, when a checkout process of goods 91 to be purchased is completed, the ownership is transferred from the seller (store) to the buyer (customer), and the customer 90 is to take the goods 91 home.

As stated above, in the wireless reading system 1 according to the present embodiment, while goods 91 are moved along the goods path 41, the reader device 2 performs wireless communication with respective electronic tags 93 attached to the goods 91, thereby reading respective pieces of goods information on the goods 91. That is, while each customer 90 is passing through the customer path 42 with the goods 91 held by the customer, the goods 91 held by the customer 90 are moved along the goods path 41 together with movement of the customer 90. Thus, while the customer 90 holding the goods 91—strictly speaking the customer 90 holding a container 92 in which the goods 91 are put is passing through the customer path 42, the goods 91 are moved along the goods path 41, so that the reader device 2 reads the respective pieces of goods information on the goods 91. Therefore, causing the reader device 2 to read respective pieces of goods information on goods 91 requires each customer 90 to pass through the customer path 42 while holding it own goods 91. Therefore, each customer's (90) act of just passing in front of the reader device 2 without stopping in front of the reader device 2 enables the reader device 2 to read goods information.

Therefore, when customers 90 shop, what is needed is that the customers 90 pick up their own goods 91 to be purchased from various goods 91 displayed in the store 8 and then pass through the customer path 42 while holding their own goods 91. Such a series of acts by each customer (90) enables the reader device 2 to read respective pieces of goods information on goods 91 to be purchased. In the shopping assistance system 100, each customer's shopping is completed by taking goods 91 home after the checkout system 3 performs a checkout process according to the respective pieces of goods information read with the reader device 2 to complete the checkout process. Thus, it is possible to provide each customer 90 with a smooth checkout process performed in response to such a series of customer's (90) acts of picking up goods 91 to pass through the customer path 42 without stopping at least only for reading respective pieces of goods information. The wireless reading system 1 according to the present embodiment and the shopping assistance system 100 with the same consequently enable reduction in customers' waiting time for purchasing their own goods 91.

A system (hereinafter referred to as a "load distribution system") is applied to the shopping assistance system 100 according to the present embodiment, thereby enabling the realization of shopping different in style than before. Here, the load distribution system is configured to temporally distribute each customer's load in a checkout process by the checkout system 3. In a conventional general shopping style, each customer 90 performs payment by, for example, a credit card, a prepaid card, electronic money, cash or the like based on a checkout process performed according to one or more pieces of goods information. Any payment method requires each customer 90 to perform payment in a checkout process after one or more pieces of goods information are read.

In contrast, with the shopping assistance system 100 according to the present embodiment, payment in a checkout process is unnecessary as a result of each customer 90 performing its own check-in process before the checkout process is started (for example, when each customer 90 enters the store). The "check-in process" stated in the present disclosure is a process of associating an identification tag 94 (see FIG. 4A) to a corresponding settlement source (or cardholder). For example, with payment by a credit card, information (cardholder or the like) unique to the credit card is regarded as the settlement source, or with payment by a prepaid card, information unique to the prepaid card is regarded as the settlement source.

Specifically, in the check-in process, a check-in terminal device 5 (see FIG. 4A) reads, for example a credit card, specifies the settlement source and then issues an identification tag 94 in which identification information associated with the settlement source is stored. Each customer 90 putting the identification tag 94 in a container 92 obtained when entering the store enables the wireless reading system 1 to read one or more pieces of goods information and the identification information together from goods 91 to be purchased (one or more electronic tags 93 attached thereto) and the identification tag 94, respectively. The wireless reading system 1 transmits the one or more pieces of goods information and the identification information to the checkout system 3, thereby enabling the checkout system 3 to perform a checkout process based on the settlement source that has been already specified in the check-in process.

That is, with the shopping assistance system 100 according to the present embodiment, each customer 90 is to perform a check-in process before a checkout process in place of performing payment procedure in the checkout process. Thus, the shopping assistance system 100 according to the present embodiment is able to realize a particular shopping style in the load distribution system in which each customer's load for its own checkout process is distributed temporally, thereby reducing each customer's load in the checkout process. It is therefore possible to reduce each customer's load while the wireless reading system 1 reads one or more pieces of goods information and the checkout system 3 then completes a checkout process, thereby realizing customers' (90) smooth shopping. The shopping assistance system 100 according to the present embodiment consequently enables reduction in customers' (90) waiting time for purchasing their own goods 91.

In other words, the settlement source is, in a conventional shopping style, specified after a checkout process is started, whereas the shopping assistance system 100 according to the present embodiment specifies the settlement source (associate the settlement source with an identification tag 94) in advance before the checkout process is started. Thus, the procedure, while each customer 90 picks up one or more goods 91 and then takes the one or more goods 91 home, by the shopping assistance system 100 according to the present embodiment is different from the conventional procedure. The wireless reading system 1 accordingly completes reading of one or more pieces of goods information, thereby enabling each customer 90 to take its own goods 91 home without performing payment procedure. It is consequently possible to improve shopping efficiency.

(2) Details

Hereinafter, the wireless reading system 1 according to the present embodiment and the shopping assistance system 100 with the same will be explained in detail. The present embodiment exemplifies a convenience store as the store into which the shopping assistance system 100 is introduced (2.1) Wireless Reading System A configuration of the wireless reading system 1 according to the present embodiment will first be explained with reference to FIGS. 1A to 2.

As stated above, the wireless reading system 1 includes the goods path 41 and the reader device 2. Also in the present embodiment, the wireless reading system 1 further includes a main computer 10. The main computer 10 is however not essential for the wireless reading system 1.

The reader device 2 is a device that performs wireless communication, whose medium is radio waves, with one or more electronic tags 93 attached to one or more goods 91, thereby reading one or more pieces of goods information on the one or more goods 91, respectively. That is, the reader device 2 performs wireless communication with one or more electronic tags 93 attached to one or more goods 91, thereby acquiring one or more pieces of goods information stored in the one or more electronic tags 93, respectively. The reader device 2 possesses (an) antennas 21 and a communicator 20. The reader device 2 is a reader that forms a radio frequency identification (RFID) system. The reader device 2 basically performs wireless communication with one or more electronic tags 93 of one or more goods 91 moved along the goods path 41, respectively. In the present embodiment, the reader device 2 possesses two or more (here, three) antennas 211, 212 and 213 (see FIG. 1B) for receiving radio waves. When the antennas 211, 212 and 213 are not distinguished in particular, each of the antennas 211, 212 and 213 is called an "antenna 21".

For example, each of the electronic tags 93 is a passive RF tag, and possesses a memory that stores at least corresponding goods information. Herein, goods 91 are associated one-to-one with their respective electronic tags 93. The electronic tags 93 store pieces of goods information on the associated goods 91, and are attached to the associated goods 91, respectively.

The electronic tags 93 may be attached to the goods 91 so as to be handled together, and specific attachment forms between the electronic tags 93 and the goods 91 include various forms. As an example of the present embodiment, the electronic tags 93 are like stickers and stuck onto the goods 91, respectively. The electronic tags 93 may be combined with the goods 91 through strings or the like, provided integrally with packages of the goods 91, embedded in the goods 91, or incorporated in the goods 91. Moreover, the electronic tags 93 may be directly printed onto the goods 91 themselves, or surfaces of the packages or the like of the goods 91 by printed semiconductor technique.

The antennas 21 transmit and receive radio waves as communication medium, thereby performing wireless communication with the electronic tags 93 in the goods path 41. That is, in the present embodiment, the antennas 21 are placed in position that allows the antennas to transmit and receive radio waves to and from goods 41 in the goods path 41. Considering polarization plane, the antennas 21 are preferably composed of circularly polarized antennas. The antennas 21 are electrically connected to the communicator 20. Configuration examples of the antennas 21 include patch antennas, monopole antennas, inverted F type antennas, slot antennas and the like. The antennas 21 may be exposed from a surface of a housing 4, or disposed inside the housing 4.

The communicator 20 is configured to transmit radio waves to one or more electronic tags 93 through the antennas 21 to receive one or more pieces of goods information from the one or more electronic tags 93 activated by the radio waves through the antennas 21, respectively. When receiving at least the one or more pieces of goods information, the communicator 20 measures respective received signal strength indications of wireless communication signals (radio waves). When receiving the one or more pieces of goods information from the one or more electronic tags 93, the communicator 20 transmits the received signal strength indications together with the one or more pieces of goods information to the main computer 10.

As shown in FIGS. 1A and 1B, the housing 4 is provided with the reader device 2. The housing 4 possesses the goods path 41 that allows one or more goods 91 held by each customer 90 passing through the customer path 42 to be moved along. In the example shown in FIGS. 1A and 1B, the housing 4 is installed beside (at a side of) the customer path 42 that allows each customer 90 to pass through. In the present embodiment, the housing 4 is installed on the right side of each customer 90 passing through the customer path 42, namely on the right side of the customer path 42. This accordingly causes each customer 90 to move goods 91 held in its own right hand along the goods path 41.

The housing 4 possesses a first side wall 401, a second side wall 402 and a linkage 403. The first and second side walls 401 and 402 are formed perpendicular to a floor surface and disposed to face each other with a predetermined space therebetween. The first and second side walls 401 and 402 are arranged with the second side wall 402 provided at a side of the customer path 42. Here, a height of the second side wall 402 from the floor surface is lower than that of the first side wall 401 from the floor surface. A lengthwise dimension of the second side wall 402 along the customer path 42 is also smaller (shorter) than that of the first side wall 401. The linkage 403 links both bottom ends of the first and second side walls 401 and 402. A space surrounded by the first and second side walls 401 and 402 and the linkage 403 forms the goods path 41. An upper face of the linkage 403 corresponds to a bottom face of the goods path 41. The second side wall 402 is situated on a boundary line between the customer path 42 and the goods path 41.

In the configuration stated above, the goods path 41 is elongated along the customer path 42. In other words, the goods path 41 is elongated along a direction of the customer path 42 through which a customer 90 pass, thereby enabling each customer 90 to move its own goods 91 along the goods path 41 by just passing through the customer path 42 while holding its own goods 91 in almost the same posture. In the present embodiment, the customer path 42 is linearly elongated. Thus, the goods path 41 is composed of a liner path substantially parallel to the customer path 42. The "along" stated in the present disclosure means keeping a distance close to a reference object. The goods path 41 elongated along the customer path 42 accordingly needn't be parallel to the customer path 42.

Figure 5:
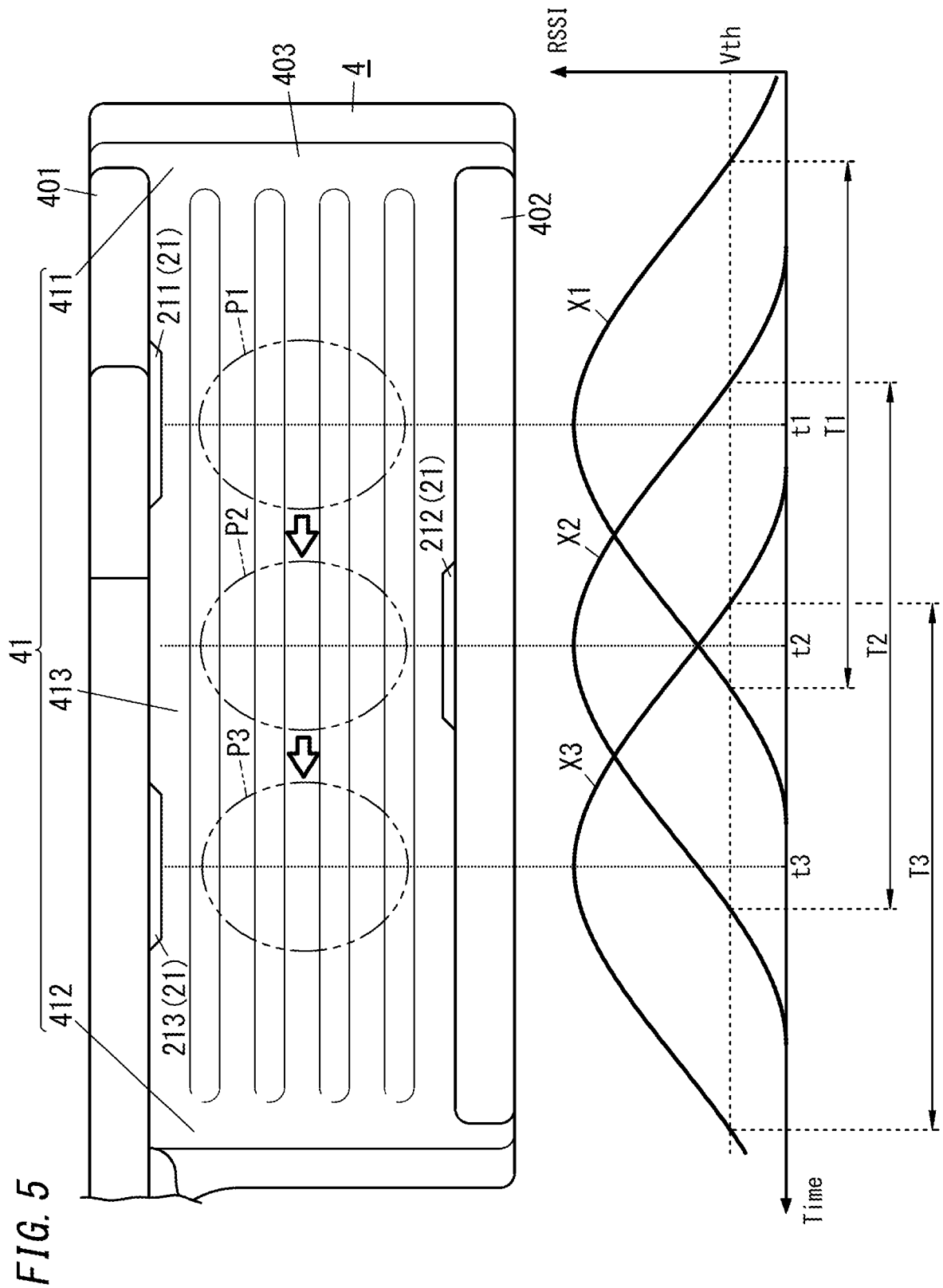
FIG. 5 is a waveform diagram exemplifying respective changes in received signal strength indications with the passage of time in the shopping assistance system.

More specifically, the goods path 41 includes an entrance 411, an exit 412 and an intermediate part 413 (see FIG. 5). The entrance 411 is an opening that allows goods 91 to enter the goods path 41 outside the goods path 41. The exit 412 is an opening that allows the goods 91 to exit outside the goods path 41 therefrom. The intermediate part 413 is a region communicating with both the entrance 411 and the exit 412. In short, in the goods path 41, the entrance 411, the intermediate part 413 and the exit 412 are arranged in this order along a direction in which each customer 90 passes through the customer path 42. Goods 91 held by each customer 90 passing through the customer path 42 are to be moved along the goods path 41 in order of the entrance 411, the intermediate part 413 and the exit 412.

The antennas 211, 212 and 213 in the reader device 2 are attached to the first and second side walls 401 and 402. The antennas 211, 212 and 213 are arranged side by side in the lengthwise direction of the goods path 41 (direction along which goods 91 are moved). Specifically, the three antennas 211, 212 and 213 are arranged in this order from the side of the entrance 411 in the lengthwise direction of the goods path 41. The antenna 211 closest to the entrance 411 and the antenna 213 closest to the exit 412 are disposed on a surface of the first side wall 401 facing the second side wall 402 (see FIG. 5). The antenna 212 in the middle of the antennas 211 and 213 in the lengthwise direction of the goods path 41 is disposed on a surface of the second side wall 402 facing the first side wall 401 (see FIG. 5). Here, each of the first and second side walls 401 and 402 and the like preferably have a function as a shield for reducing radio wave leakage outside the goods path 41. Examples of the shield for the function to be realized include metal deposited onto the housing 4, metal sheet stuck onto the housing 4, and the housing 4 itself composed of radio wave absorber (metal and the like) absorbing radio waves.

While one or more goods 91 are moved along the goods path 41, the reader device 2 performs wireless communication with one or more electronic tags 93 attached to the one or more goods 91, thereby reading one or more pieces of goods information, respectively. The goods path 41 basically prohibits a person (including a customer 90) from passing through, and also prohibits a carrying device such as a shopping cart from being moved along, and allows only things (including goods 91) held in hand by a person (including a customer 90) to be moved along. Therefore, while each customer 90 holding goods 91 in hand is passing through the customer path 42, the goods 91 are moved along the goods path 41, during which the reader device 2 reads their respective pieces of goods information. Here, when goods 91 are put in, for example the carrying device such as a shopping cart, the customer 90 takes the goods 91 out from the carrying device and then passes through the customer path 42 while holding the goods 91 in hand.

In the present embodiment, the reader device 2 reads respective pieces of goods information from electronic tags 93 attached to goods 91 with the goods 91 put in a container 92. This enables each customer 90 to cause the reader device 2 to read the pieces of goods information by picking up the goods 91 in the shop, putting the goods 91 in the container 92, and then moving the goods 91 along the goods path 91 together with the container 92. This therefore makes it possible for each customer 90 to take the goods 91 in the container 92 home as is without packing (what is called bagging) the goods 91 in the container 92 after the pieces of goods information are read. The shopping assistance system 100 consequently enables an improvement in customers' shopping efficiency. In the example to be explained in the present embodiment, the container 92 is a shopping bag (what is called plastic shopping bag) made from polyethylene or polypropylene. In drawings except FIGS. 1A, 2 and 7, although the container 92 in which the goods 91 are put is shown, the goods 91 themselves are not shown.

The reader device 2 is also able to read, from electronic tags 93 attached to goods 91 put in a container 92, pieces of goods information of the goods 91 together. Here, the reader device 2 may read the pieces of goods information from the electronic tags 93 together, or acquire the pieces of goods information one by one. It is accordingly possible for each customer 90 to once put its own goods 91 in the container 92, thereby treating the goods 91 as a bundle without separating them till taking the goods 91 home after the checkout process is completed.

In order to realize the load distribution system type of shopping style (the abovementioned shopping style in the load distribution system), the shopping assistance system 100 according to the present embodiment requires each customer 90 to receive its own identification tag 94 (see FIG. 4A) by a check-in process before a checkout process is started (for example, when each customer 90 enters the store). Although details will be described later, each customer 90 is to put its own identification tag 94 in a container 92 taken when entering the store. Therefore, while each customer 90 is passing through the customer path 42, the container 92 in which goods 91 are put also houses the identification tag 94 together with the goods 91. That is, while the customer 90 is moving the container 92 together with the goods 91 therein, the identification tag 94 is also moved along the goods path 41 together with the goods 91. This enables the reader device 2 to read, together with one or more pieces of goods information, the identification information stored in the identification tag 94.

The main computer 10 possesses a strength capturing unit 11, a determination unit 12, an information receiver 13, a discriminator 14 and a selector 15. In the present embodiment, the main computer 10 is a computer system including, as main components, hardware such as a processor and a memory. The main computer 10 causes the processor to execute a program stored in the memory, thereby realizing functions of the strength capturing unit 11, the determination unit 12, the information receiver 13, the discriminator 14 and the selector 15. The program may be stored in the memory of the main computer 10 in advance, provided via a telecommunications network, or provided via a non-transitory computer readable medium such as an optical disk or a hard disk drive. In the present embodiment, the main computer 10 is provided in one housing 4 together with the reader device 2.

The main computer 10 is connected to not only the reader device 2 but also as stated below, the checkout system 3, the check-in terminal device 5, a gate system (gate devices 61), a notification device 62, a customer detector 63, a trigger detector 64 and an indicator 65. The main computer 10 is further configured to communicate with a store terminal composed of, for example a POS terminal. The main computer 10 is configured to, based on one or more pieces of goods information received through the information receiver 13 from the reader device 2, perform predetermined processes such as a transmission process of transmitting, to the checkout system 3, information necessary for a checkout process by the checkout system 3.

The strength capturing unit 11 is configured to acquire received signal strength indications (RSSIs) while the reader device 2 performs wireless communication. The strength capturing unit 11 acquires the received signal strength indications from the reader device 2. Here, when the reader device 2 reads respective pieces of goods information on two or more goods 91 at the same time, the strength capturing unit 11 acquires a received signal strength indication for each item of the goods 91. The strength capturing unit 11 acquires received signal strength indications from the reader device 2 at regular intervals (e.g., intervals of 100 msec) to sore the received signal strength indications in the memory of the main computer 10.

The determination unit 12 is configured to determine whether or not goods 91 are a target to be purchased based on respective changes with time in the received signal strength indications for each item of goods 91. Herein, the determination unit 12 analyzes the changes in the received signal strength indications every item of goods 91 for a determination period to determine whether or not each item of the goods 91 is a target to be purchased based on a result of analysis thereby. In the present embodiment, the determination unit 12 analyzes respective change patterns of the received signal strength indications for the determination period, stored in the memory of the main computer 10, thereby determining whether or not the goods 91 are a target to be purchased. The "determination period" stated in the present disclosure has a predetermined length of time starting at a point in time when the trigger detector 64 to be described later detects a trigger, and is, for example a period of 10 seconds.

That is, in the wireless reading system 1 as stated above, while one or more goods 91 are moved along the goods path 41, the reader device 2 performs wireless communication with one or more electronic tags 93 attached to the one or more goods 91, thereby reading one or more pieces of goods information, respectively. The goods 91 to be purchased accordingly generate, in their respective received signal strength indications, changes specific to the goods 91 moved along (passing through) the goods path 41. The determination unit 12 therefore determines whether or not the goods 91 are a target to be purchased according to presence or absence of such changes in the received signal strength indications.

The information receiver 13 is configured to acquire pieces of goods information on goods 91 from the reader device 2. Although details will be described later, the reader device 2 establishes wireless communication with electronic tags 93 attached to the goods 91 and then receives respective pieces of goods information on the goods 91 to which the electronic tags 93 are attached. Thus, the information receiver 13 acquires, from the reader device 2, the respective pieces of goods information read (received) from the electronic tags 93 through the reader device 2. Here, when the reader device 2 reads the respective pieces of goods information on the goods 91 at the same time, the information receiver 13 acquires goods information for each item of the goods 91. The information receiver 13 acquires, at regular intervals (e.g., 100 ms), goods information from the reader device 2 to be stored in the memory of the main computer 10.

The discriminator 14 is configured to, when of the antennas 21, two or more antennas 21 receive (the same) radio waves, discriminate (or determine) respective positions in order in which the two or more antennas 21 receive radio waves (in other words, the respective positions constitute the order). For example, when the reader device 2 receives radio waves in order of the antennas 211, 212 and 212, the discriminator 14 discriminates respective positions in this order (in order of antennas 211, 212 and 212). For example, the determination unit 12 determines whether or not goods 91 are a target to be purchased based on a result of discrimination by the discriminator 14. A discrimination process by the discriminator 14 will be described in detail in "(2.3) Operation".

The selector 15 is configured to select one or more pieces of goods information as a target to be purchased from pieces of goods information based on a result of determination by the determination unit 12. That is, when the information receiver 13 acquires two or more pieces of goods information on two or more goods 91 from the reader device 2, respectively, the selector 15 selects, from the two or more pieces of goods information, respective pieces of goods information on goods 91 to be purchased. The selector 15 may select two or more pieces of goods information as a goods information as a target to be purchased. Here, same type goods 91 are provided with individual pieces of goods information. Therefore, even in the case of same type goods 91, each item of the same type goods 91 can be specified based on their respective pieces of goods information.

The selector 15 is further configured to provide one or more pieces of goods information to be purchased to the checkout system 3 to perform a checkout process for one or more goods 91. That is, the main computer 10 provides the checkout system 3 with one or more pieces of goods information to be purchased, selected by the selector 15. As a result, only one or more goods 91 determined as a target to be purchased are rendered a target of the checkout process by the checkout system 3.

Specifically, when receiving one or more pieces of goods information through the information receiver 13 from the reader device 2, the main computer 10 acquires the received signal strength indications through the strength capturing unit 11 from the reader device 2 together with the one or more pieces of goods information. That is, the main computer 10 receives a collection of goods information and a collection of corresponding received signal strength indications at regular intervals (e.g., intervals of 100 ms). Whenever receiving a collection of goods information and a collection of corresponding received signal strength indications, the main computer 10 stores, for each piece of goods information, a corresponding received signal strength indication for a reserve time (e.g., 1 minute) in the memory of the main computer 10. As a result, the memory of the main computer 10 is to store, for each item of goods 91, namely for each piece of goods information, a corresponding received signal strength indication. Such received signal strength indications stored in the memory of the main computer 10 may be deleted not only when the reserve time has elapsed but also when goods information is not received any longer.

The main computer 10 causes the determination unit 12 to analyze, for each item of goods 91, a change in a corresponding received signal strength indication for the reserve time based on a corresponding received signal strength indication for the reserve time for each piece of goods information stored in the memory. The determination unit 12 determines whether or not one or more goods 91 are a target to be purchased by comparing a result of analysis thereof with predetermined determination conditions. The "determination conditions" stated in the present disclosure mean conditions by which the determination unit 12 determines whether or not one or more goods 91 are a target to be purchased. Details of a determination process by the determination unit 12 based on the determination conditions will be explained in "(2.3) Operation".

In order to realize the load distribution system type of shopping style, the shopping assistance system 100 according to the present embodiment causes the reader device 2 to read the identification information stored in the identification tag 94 together with one or more pieces of goods information. Therefore, like the one or more pieces of goods information, the information receiver 13 acquires the identification information from the reader device 2, and the selector 15 selects the identification information based on the result of determination by the determination unit 12 to provide the identification information to the checkout system 3. Thus, the main computer 10 provides the checkout system 3 with the identification information together with one or more pieces of goods information to be purchased, thereby enabling the checkout system 3 to perform a checkout process for the settlement source specified during a corresponding check-in process.

The main computer 10 is further configured to communicate with, to be stated later, the checkout system 3, the check-in terminal device 5, the gate devices 61, the notification device 62, the customer detector 63, the trigger detector 64 and the indicator 65, thereby controlling these components.

(2.2) Shopping Assistance System

Overall structure of the shopping assistance system 100 according to the present embodiment will hereinafter be explained with reference to FIGS. 1A to 2.

The shopping assistance system 100 is equipped with the abovementioned wireless reading system 1 and checkout system 3. In the present embodiment, the shopping assistance system 100 is further equipped with the check-in terminal device 5, the gate devices 61, the notification device 62, the customer detector 63, the trigger detector 64 and the indicator 65. In the present embodiment, the customer detector 63, the trigger detector 64 and the indicator 65 are provided in the one housing 4 together with the wireless reading system 1. However, the check-in terminal device 5, the gate devices 61, the notification device 62, the customer detector 63, the trigger detector 64 and the indicator 65 are not essential for the shopping assistance system 100.

The checkout system 3 possesses a display device 31, an input device 32 and a voice output device 33. Each of the display device 31, the input device 32 and the voice output device 33 is a peripheral device of the main computer 10 and connected to the main computer 10.

The display device 31 is a device that shows each customer 90 various displays. The input device 32 is a device that receives each customer's (90) operation through touch input, gesture detection or the like. Alternatively, the input device 32 may receive an operation for moving an integrated circuit (IC) or a personal digital assistant such as a smartphone or a wearable device close to the input device 32. The input device 32 further includes a microphone and possesses a function for applying a speech recognition process and a semantic analysis process to a voice signal captured through the microphone. This therefore enables each customer 90 to perform a voice operation (voice input). The voice output device 33 is a device that includes a loudspeaker and presents various kinds of information to each customer 90 by voice.

Alternatively, the input device 32 may operate in tandem with the customer detector 63 to be described later to receive, therefrom, an event showing that a customer 90 has passed through the customer path 42. That is, when the customer detector 63 detects a customer 90 passing through the customer path 42 to exit from the customer path 42, the input device 32 determines the presence of the customer's (90) operation based the result of detection by the customer detector 63.

In the present embodiment, at least the reader device 2 and the checkout system 3 of the wireless reading system 1 are provided in the one housing 4. Specifically, the display device 31 and the input device 32 of the checkout system 3 are installed on the first side wall 401 of the housing 4. In the example shown in FIGS. 1A and 1B, the display device 31 and the input device 32 are integrated as a touch panel display. The display device 31 and the input device 32 are disposed at a front end of the goods path 41 as viewed from a customer 90 passing through the customer path 42, namely ahead of the exit 412 of the goods path 41. Therefore, after goods 91 are moved along the goods path 41, the customer 90 reaches a front of the display device 31 and the input device 32. In the present embodiment, the housing 4 is also provided with the voice output device 33 (see FIG. 2). The housing 4 further possesses a goods-support 404 that allows each customer's carrier bag (including goods 91) to be put on while the checkout system 3 performs a checkout process. The goods-support 404 is disposed below the display device 31 and the input device 32 on the first side wall 401.

The checkout system 3 is able to present, to each customer 90, various information through display or voice by at least one of the display device 31 and the voice output device 33 as user interfaces, or receive each customer's (90) operation (including voice input) through the input device 32 as a user interface. Note that the information may be presented by at least one of the display and the voice by the checkout system 3, by either the display or the voice, or by a combination of the display and the voice.

As an example, the checkout system 3 may present, to each customer 90, a message such as "Welcome" and "Thank you" when each customer enters the store and when a corresponding checkout process is completed, respectively. It is accordingly possible to give each customer 90 a sense of affinity like clerk service. The checkout system 3 also enables each customer 90 to perform an operation necessary for the checkout process by, for example, confirming a list of goods 91 to be purchased, a checkout amount and the like that are displayed on the display device 31 and subsequently performing an acceptance operation through the input device 32. Here, the checkout system 3 may possess a printer and cause the printer to issue (print) a receipt when the checkout process is completed. However, the reception of the customer's operation through the input device 32 and the issue of the receipt in the checkout process are not essential for the shopping assistance system 100. A configuration in which the reception of each customer's operation and the issue of the receipt in the checkout process are not performed enables each customer 90 to take its own goods 91 home without stopping (i.e., non-stop) when the wireless reading system 1 has read corresponding pieces of goods information.

As stated above, the configuration in which the input device 32 receives a fact, which a customer 90 has passed through the customer path 42, as a customer's (90) operation enables the customer 90 to omit the acceptance operation to be performed additionally. It is accordingly possible for each customer 90 to, after passing through the customer path 42, complete the checkout process by just passing therethrough without stopping in front of the input device 32 for a touch input operation and the like.

The checkout system 3 may transmit information (hereinafter referred to as "purchase information") on the list of goods 91 to be purchased and the checkout amount to the main computer 10 or the store terminal. Accordingly, the access to the purchase information or the issue of the receipt become possible through an information terminal that is installed in the store 8 and different from the checkout system 3, or a personal digital assistant owned by each customer 90 such as a smartphone or a tablet computer. Moreover, the main computer 10, the store terminal or the like transmits the purchase information to a server, and thereby the access to the purchase information or the issue of the receipt is possible through the personal digital assistant owned by each customer 90 after leaving the store.

The check-in terminal device 5 is a terminal device for performing a check-in process. The check-in terminal device 5 is installed near, for example an entrance 81 of the store 8 (see FIG. 3). The check-in terminal device 5 is configured to perform two-way communication with the main computer 10 by wireless communication whose medium is radio waves. The check-in terminal device 5 performs a check-in process for each customer 90 after entering the store 8. As stated above, in the check-in process, the check-in terminal device 5 reads, for example a credit card to specify the settlement source, and then issues an identification tag 94 (see FIG. 4A) that stores identification information associated with the settlement source. The check-in terminal device 5 transmits data representing the settlement source (e.g., information unique to the credit card) to the main computer 10 together with corresponding identification information. The main computer 10 stores the settlement source and the identification information in the memory thereof. Each identification tag 94 is, for example a passive RF tag like the electronic tags 93, and possesses a memory that stores at least its own identification information. Each identification tag 94 is in the shape of, for example a card.

For example, each identification tag 94 is provided with an available time limit. As an example, when the check-in terminal device 5 transmits the data representing the settlement source and the identification information to the main computer 10 and then a predetermined time elapses, the main computer 10 deletes the data representing the settlement source and the identification information stored in the memory. Thus, when an identification tag 94 is issued and then the predetermined time elapses, the identification tag 94 is invalidated and prohibits a corresponding checkout process with the identification tag 94. Together with the available time or in place of the available time, each identification tag 94 may be provided with a limit to the number of times a checkout process is performed through. In this case, when an identification tag 94 is issued and then the number of times a checkout process is performed through the identification tag 94 reaches a predetermined number of times, the main computer 10 deletes data representing a corresponding settlement source and corresponding identification information stored in the memory. It is accordingly possible to suppress unauthorized use of each identification tag 94 or misrecognition.

The gate devices (gate system) 61 are configured to wireless communicate, whose medium is radio waves, with respective electronic tags 93 attached to goods 91, thereby reading their respective pieces of goods information, like the reader device 2. The gate devices 61 are installed at, for example an exit 82 of the store 8 (see FIG. 3). The gate devices 61 are configured to perform two-way communication with the main computer 10 by wireless communication whose medium is radio waves. Whenever each customer 90 leaves the store 8 through the exit 82, the gate devices 61 communicate with one or more electronic tags 93 attached to one or more goods 91 in the container 92 held by the customer 90 in a contactless manner. In this case, the gate devices 61 determine whether or not the checkout process based on one or more pieces of goods information read from one or more electronic tags 93 has been performed. In the present embodiment, whether or not the checkout process based on the one or more pieces of goods information has been completed is determined based on, for example a checkout completion flag that is associated with the one or more pieces of goods information and stored in the memory of the main computer 10. For example, when the checkout process for the one or more goods 91 has been completed, the checkout completion flag for the one or more goods 91 has a value of "1". Therefore, the gate devices 61 determine that the checkout process has not yet been completed when the checkout completion flag corresponding to one or more pieces of goods information read from one or more electronic tags 93 has a value of "0", and also determines that the checkout process has been completed when the checkout completion flag corresponding to the one or more pieces of goods information has the value of "1".

The notification device 62 is configured to perform a notification process when the checkout process based on one or more pieces of goods information read through the gate devices 61 has not been performed. That is, the gate devices 61 and the notification device 62 make it possible to confirm that the checkout process for goods 91 taken out of the store has been successfully completed. For example, the notification device 62 is provided integrally with the gate devices 61. Examples of the notification by the notification device 62 include, but not limited to, display notification and voice notification by the notification device 62 itself, and notification by the store terminal and the like in response to the transmission of a notification signal from the notification device 62 to the main computer 10.

The customer detector 63 is configured to detect each customer's (90) movement. A result of detection by the customer detector 63 is transmitted to the main computer 10, and utilized for a reading process of goods information by the wireless reading system 1. Although details will be described later, the wireless reading system 1 performs reading of goods information in response to the result of detection by the customer detector 63. Therefore, the customer detector 63 is to detect at least movement of a customer 90 passing through the customer path 42 (as an example, movement direction, moving speed and the like). Examples of the customer detector 63 to be realized include motion detectors each of which is configured to detect positions of a person passing through the customer path 42, such as a pyroelectric sensor and an image sensor.

The trigger detector 64 is configured to detect that goods 91 are introduced into the goods path 41. Although details will be described later, the trigger detector 64 detects as a "trigger" that goods 91 are introduced into the goods path 41, and then the main computer 10 causes the determination unit 12 to start a determination process. Examples of the trigger detector 64 to be realized include object sensors each of which is configured to detect presence or absence of (an) objects (goods 91) in the goods path 41, such as an optical sensor, an ultrasonic sensor and an image sensor. Examples of the trigger detector 64 to be realized may also include motion detectors each of which is configured to detect that a customer 90 enters the customer path 42, such as a pyroelectric sensor and an image sensor. The sensor of the customer detector 63 may double as the trigger detector 64.

The indicator 65 is configured to perform various displays that represent a state of the shopping assistance system 100, such as error indication. As an example, the indicator 65 represents the state of the shopping assistance system 100 by an emitting state thereof such as ON, OFF and luminous color. For example, when the goods path 41 allows goods 91 to be moved along, the indicator 65 emits green light, while when it is in use by a customer 90, the indicator 65 is turned off. When an error such as insufficient funds in electronic money account or a checkout process error occurs, the indicator 65 emits red light. The indicator 65 emits yellow light in order to call a store clerk. As an example of the present embodiment, the indicator 65 is disposed at an upper end of the first side wall 401 on a side of the entrance area 411 of the goods path 41.

For example, one store 8 may be provided with two or more shopping assistance systems 100 as explained above. Positional relation and shapes of components of the shopping assistance system 100 according to the present embodiment are just one example and may be modified appropriately.

(2.3) Operation

An operation of the shopping assistance system 100 according to the present embodiment, namely a shopping assistance method for the shopping assistance system 100 will hereinafter be explained with reference to FIGS. 3 to 6.

Figure 3:
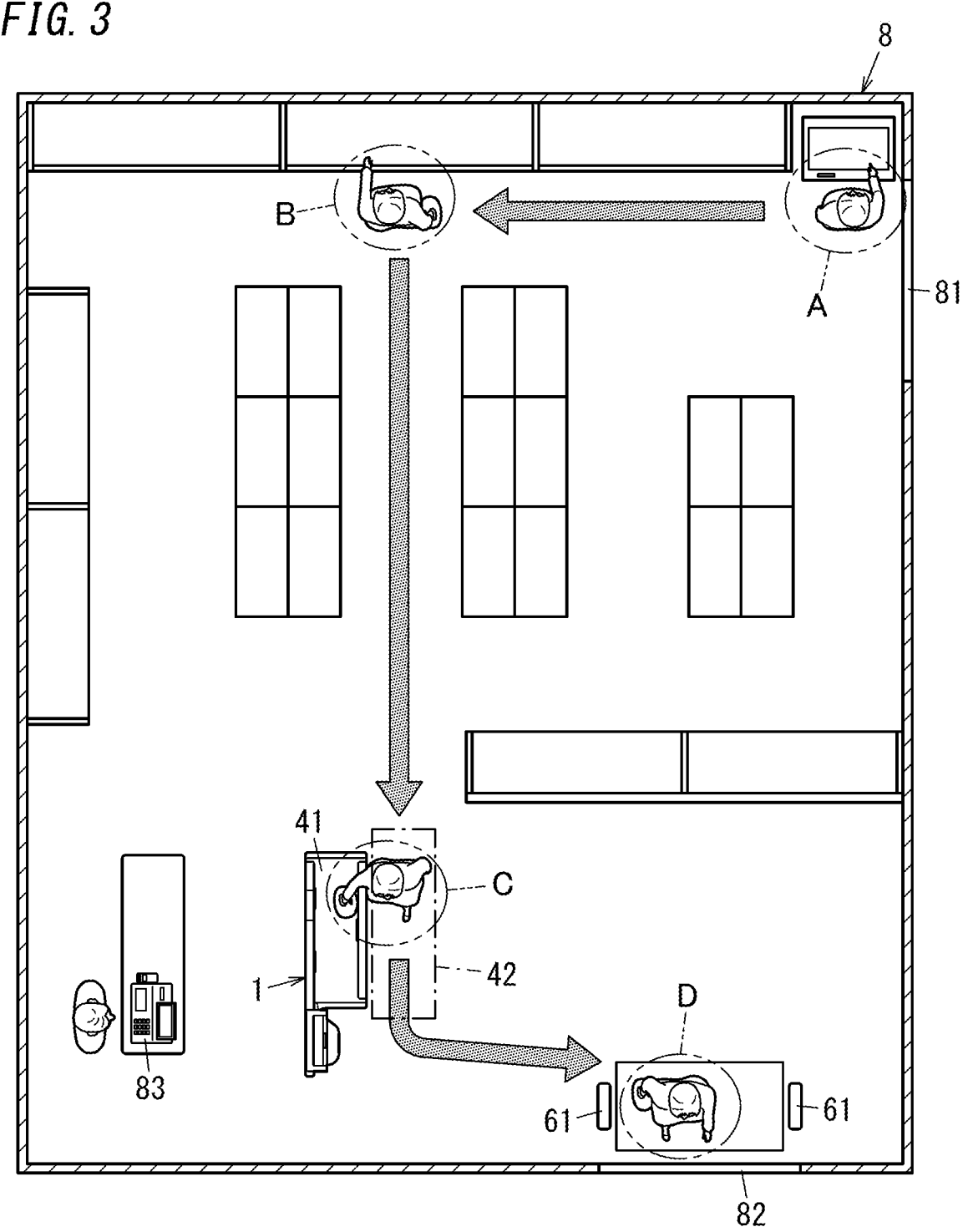
FIG. 3 is a plan view of a store into which the shopping assistance system is introduced.
Figure 4A:
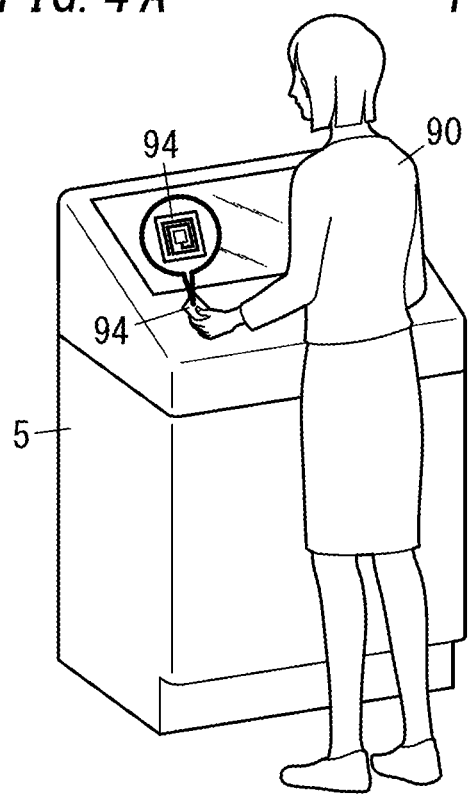
FIG. 4A is a view schematically illustrating a shopping act of a customer using the shopping assistance system.
Figure 4B:
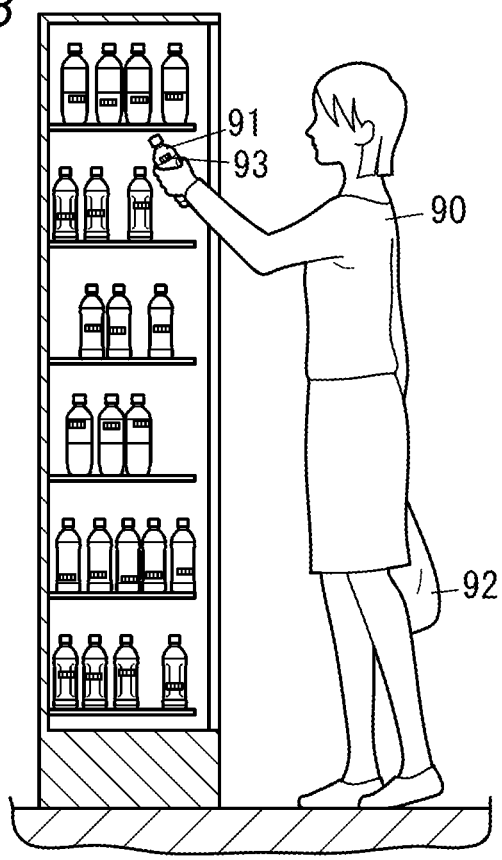
FIG. 4B is a view schematically illustrating a shopping act of a customer using the shopping assistance system.
Figure 6:
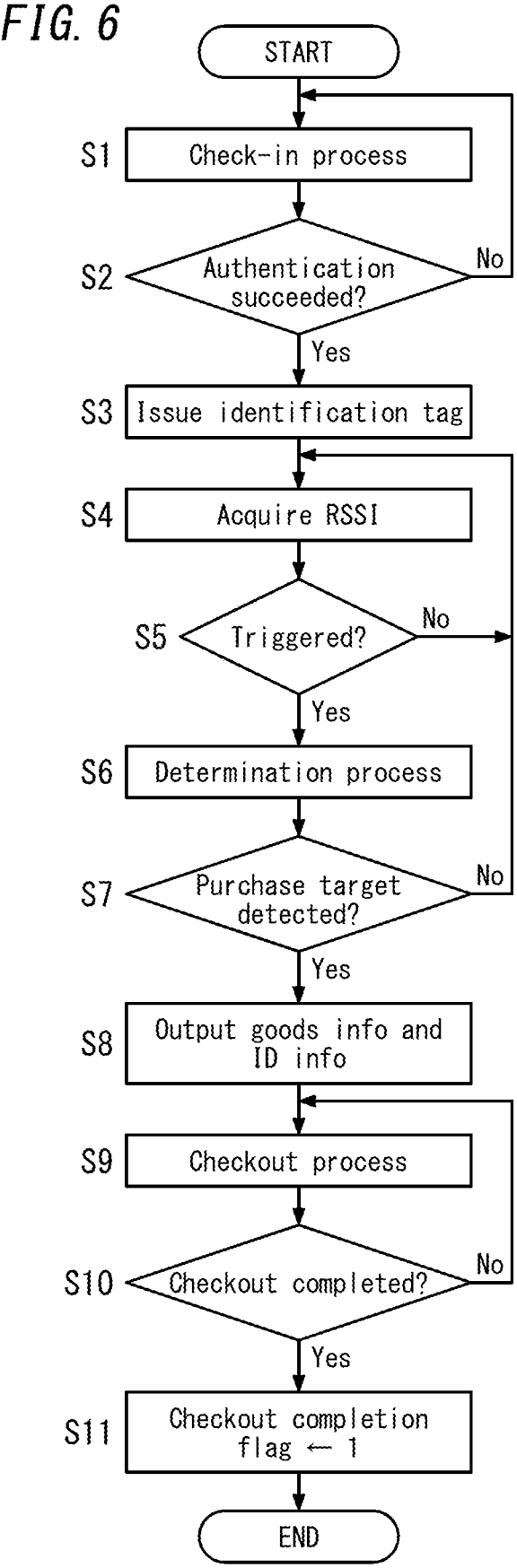
FIG. 6 is a flowchart showing an operation of the shopping assistance system.

FIG. 3 is a plan view of the store 8 into which the shopping assistance system 100 is introduced. FIGS. 4A to 4B illustrate respective acts of a customer 90 in respective positions depicted by "A" to "D" in FIG. 3. FIG. 5 is a waveform diagram exemplifying changes in received signal strength indications with goods 91 moved along the goods path 41. FIG. 6 is a flowchart showing the operation of the shopping assistance system 100.

As an example herein, it is assumed that as shown in FIG. 3, a customer 90 enters the store from the entrance 81, picks up one or more goods 91 to be purchased from a refrigerator, passes through the customer path 42, passes between a pair of gate devices 61, and then leaves the store through the exit 82. That is, in the example of FIG. 3, the customer 90 enters the store from a position depicted by "A", then picks up one or more goods 91 at a position depicted by "B", then moves to a position depicted by "C" and then moves to a position depicted by "D". The store 8 shown in FIG. 3 is also provided with a manned checkout counter 83.

As shown in FIG. 4A, just after entering the store, the customer 90 first performs an operation necessary for a check-in process of the check-in terminal device 5 at the position depicted by "A" in FIG. 3. The check-in terminal device 5 then reads, for example a customer's (90) credit card to specify a settlement source thereof, and issues an identification tag 94 that stores identification information associated with the settlement source. Here, the check-in terminal device 5 may read non-settlement information, which is member information or the like and from which the settlement source is not directly specified, from a member's card or the like to specify the settlement source. The non-settlement information such as the member information is registered in advance with the non-settlement information associated with the settlement source. This enables the check-in terminal device 5 to indirectly specify the settlement source from the non-settlement information.

Herein, the wireless reading system 1 has an advantage of being able to read goods information with goods 91 put in a container 91. For this advantage, the goods 91 are preferably put in the container 91 before the goods information is read. Therefore, in the present embodiment, each customer 90 is provided with a container 92 when entering the store. A provision method of the container 92 is not limited in particular. For example, each customer 90 may take a container 92 from a bag stocker installed near the entrance 81 of the store 8, or a store clerk(s) may hand each customer 90 a container 92. This examples enable each customer 90 to immediately put an identification tag 94 issued by a corresponding check-in process in a container 92 provided when entering the store.

At the position depicted by "B" in FIG. 3, the customer 90 then picks up, from the refrigerator, one or more goods 91 to which one or more electronic tags 93 are attached, respectively, as shown in FIG. 4B. In this case, the customer 90 puts the picked up one or more goods 91 in the container 92 in which the identification tag 94 has already been put. Thus, the one or more goods 91 and the identification tag 94 are put together in the container 92. In the example of FIG. 4B, although the customer 90 picks up just one item of goods 91, the customer 90 is to, when purchasing two or more goods 91, perform the same act with respect to other goods 91, thereby whenever picking up each item of the two or more goods, putting it in the container 92.

Figure 4C:
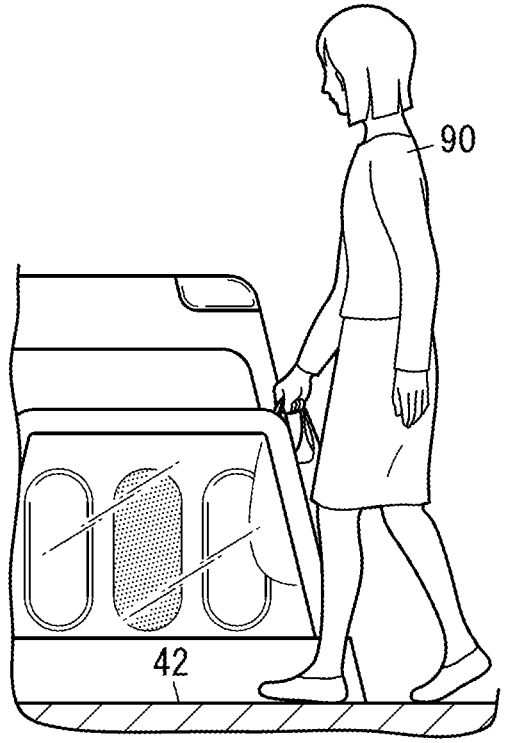
FIG. 4C is a view schematically illustrating a shopping act of a customer using the shopping assistance system.

At the position depicted by "C" in FIG. 3, the customer 90 passes through the customer path 42 as shown in FIG. 4C. In this case, the customer 90 holds the one or more goods 91 with the one or more goods 91 put in the container 92. That is, the customer 90 holds, in hand, the container 92 in which the one or more goods 91 are put, thereby indirectly holding the one or more goods 91. The customer 90 then moves the container 92 together with the one or more goods 91 along the goods path 41, thereby causing the reader device 2 to read one or more pieces of goods information, respectively. Since the one or more goods 91 and the identification tag 94 are put in the container 92, the reader device 2 reads the identification information stored in the identification tag 94 together with the one or more pieces of goods information.

Thus, reading the one or more pieces of goods information with the one or more goods 91 put in the container 92 enables omission of labor of taking out the one or more goods 91 from the container 92. Specifically, the wireless reading system 1 reads the one or more pieces of goods information with the one or more goods 91 put in the container 92, and the checkout system 3 performs a checkout process based on the one or more pieces of goods information, thereby enabling the customer 90 to take the one or more goods 91, which have already been put in the container 92, home as is. This makes it unnecessary for the customer 90 to put the one or more goods 91 in the container 92 (what is called bagging work) after the checkout process. The customer 90 is therefore able to smoothly perform a series of acts from picking up the one or more goods 91 to the checkout process, further to taking the one or more goods 91 home after the checkout process, enabling improvement in shopping efficiency.

Moreover, the load distribution system type of shopping style is applied to the present embodiment. Therefore, when the identification information read through the reader device 2 is transmitted to the checkout system 3, the checkout system 3 is able to perform the checkout process based on the settlement source specified in the check-in process. This makes it unnecessary for the customer 90 to take out a customer's credit card for the checkout, thereby reducing the labor of the customer 90 in the checkout process. In short, the embodiment enables the customer 90 to complete the checkout process just by confirming, for example, a list of one or more goods 91 to be purchased, a checkout amount and the like that are displayed on the display device 31 and subsequently performing an acceptance operation through the input device 32.

Herein, the wireless reading system 1 determines whether or not the one or more goods 91 are a target to be purchased by performing a determination process based on the determination conditions to be explained below.

In the present embodiment, the determination conditions contain at least two first and second conditions. When the determination unit 12 acquires an analysis result satisfying both the first and second conditions, the one or more goods 91 are determined to be the target to be purchased. The first condition is that there are changes in received signal strength indications specific to the one or more goods 91 moved along (passing through) the goods path 41. The second condition is that there is a correlation between movement of the customer 90 shown by a result of detection by the customer detector 63 and movement of the one or more goods 91.

Determination based on the first condition is performed along with patterns of changes in received signal strength indications as illustrated in FIG. 5. In FIG. 5, the top thereof is a plan view of the goods path 41 and the bottom thereof shows the changes in the received signal strength indications where a horizontal axis is a time axis and a vertical axis is a received signal strength indication. Here, in the plan view on the top of FIG. 5, some positions P1 to P3 of the one or more goods 91 moved along the goods path 41 are depicted by imaginary lines (long dashed double-short dashed line). In a wave form chart on the bottom of FIG. 5, received signal strength indications by the antennas 211, 212 and 213 are depicted by "X1", "X2" and "X3", respectively. In the example of FIG. 5, it is assumed that the one or more goods 91 are moved along the goods path 41 at a regular speed. The positions P1 to P3 in the plan view on the top of FIG. 5 correspond one-to-one to points in time t1 to T3 in the wave form chart on the bottom of FIG. 5, respectively.

In this case, the received signal strength indication of goods information acquired through the reader device 2 from each item of goods 91 to be purchased that are held by the customer 90 changes as shown in, for example FIG. 5. That is, respective received signal strength indications acquired through the antennas 211, 212 and 213 from movement of each item of goods 91 introduced into the goods path 41 by an act of the customer 90 rise up in order of the antennas 211, 212 and 213. The "rise up" stated in the present disclosure means that the received signal strength indication increases at a slope that is a predetermined angle or more to change from a level less than a threshold Vth to a level of the threshold Vth or more. In the example of FIG. 5, a maximum received signal strength indication X1 is acquired through the antenna 211 when the goods 91 are at the position of P1 in front of the antenna 211. Similarly, a maximum received signal strength indication X2 is acquired through the antenna 212 when the goods 91 are at the position of P2 in front of the antenna 212. A maximum received signal strength indication X3 is also acquired through the antenna 213 when the goods 91 are at the position of P3 in front of the antenna 213.

In the present embodiment, the discriminator 14 determines that the antenna 21 receives radio waves if the received signal strength indication thereof is the threshold Vth or more. Therefore, in the example of FIG. 5, the discriminator 14 determines that the antenna 211 receives radio waves during a period of time T1 containing the point in time t1, the antenna 212 receives the radio waves during a period of time T2 containing the point in time t2, and the antenna 213 receives the radio waves during a period of time T3 containing the point in time t3. Thus, the discriminator 14 discriminates respective positions in order of the antennas 211, 212 and 213. As an example, when radio waves are first received by only the antenna 211, then received by the antennas 211 and 212, and then received by only the antenna 212, the discriminator 14 determines that the antennas 211 and 212 receive the radio waves in this order. Similarly, when radio waves are received by only the antenna 212, then received by the antennas 212 and 213, and then received by only the antenna 213, the discriminator 14 determines that the antennas 212 and 213 receive the radio waves in this order. The determination unit 12 receives such a result of discrimination by the discriminator 14 (order of the antennas 211, 212 and 213) to perform determination based on the first condition.

In short, the received signal strength indications have their respective changes specific to goods 91 moved along (passing though) the goods path 41 such that the antennas 211, 212 and 213 receive radio waves in this order. The determination unit 12 accordingly specifies, from a result of discrimination by the discriminator 14, the order in which the antennas 211, 212 and 213 receive the radio waves. The determination unit 12 also determines that the first condition is satisfied when the antennas 211, 212 and 213 receives radio waves in this order.

On the other hand, determination based on the second condition is performed along with a relation between, for example, a movement direction, a moving speed and the like of the customer 90 detected with the customer detector 63 and movement of goods 91 specified by patterns of changes in the received signal strength indications as illustrated in FIG. 5. That is, as stated above, the result of discrimination by the discriminator 14 acquired from the patterns of changes in the received signal strength indications makes it possible to specify not only the direction of the movement of the goods 91 and but also the moving speed of the goods. The determination unit 12 determines that the second condition is satisfied when there is a prescribed correlation between movement of goods 91 (as an example, movement direction, moving speed, etc.) and movement of the customer 90 detected with the customer detector 63. For example, it is determined that movement of the customer 90 and movement of the goods 91 have the correlation when the movement direction of the goods 91 accords with the movement direction of the customer 90 and a difference between the moving speed of the goods 91 and a moving speed of the customer 90 is within a predetermined permissible range. In other words, the wireless reading system 1 reads goods information in response to a result of detection by the customer detector 63 configured to detect movement of the customer 90.

Thus, when determining that the determination conditions (first and second conditions) are satisfied, the determination unit 12 determines that the goods 91 are a target to be purchased.

The shopping assistance system 100 consequently makes it possible to, even if the reader device 2 reads, for example any goods information from goods 91 not to be purchased such as goods 91 displayed near the reader device 2, discriminate between those goods 91 and goods 91 to be purchased. In the shopping assistance system 100, for example, only goods 91 determined as a target to be purchased become a target of a checkout process by the checkout system 3, thereby preventing goods 91 not to be purchased from being a target of a checkout process. Therefore, in the shopping assistance system 100, false detection of a target to be purchased hardly occurs.

The algorithm for the abovementioned determination is merely one example. For example, the determination unit 12 may determine that goods 91 are a target to be purchased when another determination condition different from the abovementioned determination conditions is satisfied as explained below. That is, the determination unit 12 may determine that the determination condition is satisfied, for example when all the antennas 211, 212 and 213 receive radio waves at the same time. Specifically, if each of the antennas 211, 212 and 213 has narrow directivity, each received signal strength indication by the antennas 211, 212 and 213 as illustrated in FIG. 5 has a gentle waveform. As a result, when goods 91 are moved along the goods path 41, respective time lags between a period of time T1 during which the antenna 211 receives radio waves, a period of time T2 during which the antenna 212 receives the radio waves and a period of time T3 during which the antenna 213 receives the radio waves are rendered relatively small. On the other hand, when goods 91 are moved along the goods path 41, a period of time during which all the periods of time T1 to T3 overlap is rendered relatively long. Therefore, when all the antennas 211, 212 and 213 receive radio waves at the same time, specifically when a period of time during which all the periods of time T1 to T3 overlap continues for a predetermined time or more, the determination unit 12 determines that the determination condition is satisfied. Even in this case, the shopping assistance system 100 is able to discriminate between goods 91 to be purchased that are moved along the goods path 41, and goods 91 not to be purchased such as goods 91 displayed near the reader device 2.

An overall operation of the shopping assistance system 100 according to the present embodiment will hereinafter be explained with reference to FIG. 6.

When a customer 90 enters the store, the shopping assistance system 100 first causes the check-in terminal device 5 to perform a check-in process (S1). In the check-in process, the check-in terminal device 5 verifies the authentication of, for example his or her credit card (S2). When succeeding in verifying the authentication to specify a settlement source (S2: Yes), the check-in terminal device 5 issues an identification tag 94 in which identification information associated with the settlement source is stored (S3). When the authentication is failed (S2: No), Step S1 is returned to.

When the customer 90 passes through the customer path 42 while moving one or more goods 91 along the goods path 41, the wireless reading system 1 reads one or more pieces of goods information, respectively. In this case, the shopping assistance system 100 first causes the strength capturing unit 11 to acquire respective received signal strength indications (RSSIs) (S4). The shopping assistance system 100 then determines presence or absence of a trigger (S5). That is, if goods 91 are not introduced into the goods path 41, the trigger detector 64 detects no trigger. The shopping assistance system 100 therefore determines the absence of the trigger (S5: No), and then Step S4 is returned to. On the other hand, when one or more goods 91 are introduced into the goods path 41, the trigger detector 64 detects a trigger. The shopping assistance system 100 therefore determines the presence of the trigger (S5: Yes), and then performs a determination process (S6).

In the determination process, the shopping assistance system 100 causes the determination unit 12 to determine whether or not goods 91 are a target to be purchased based on a change with time in a received signal strength indication for each of the one or more goods 91. The shopping assistance system 100 determines whether or not the one or more goods 91 are a target to be purchased based on the result of determination (S7). In this case, the shopping assistance system 100 determines the absence of the target to be purchased (S7: No), and then Step S4 is returned to. On the other hand, when determining the presence of the target to be purchased (S7: Yes), the shopping assistance system 100 causes the selector 15 to provide the checkout system 3 with one or more pieces of goods information on the one or more goods 91 to be purchased together with identification information read from the identification tag 94 (S8).

When receiving the one or more pieces of goods information and the identification information, the checkout system 3 performs a corresponding checkout process (S9). The shopping assistance system 100 determines whether or not the checkout system 3 completes the checkout process (S10). The shopping assistance system 100 determines that the checkout process is not completed (S10: No), Step S9 is returned to. On the other hand, when the checkout of the one or more goods 91 is completed, the checkout system 3 notifies the main computer 10 that the checkout process is completed. When receiving the notification of completion of the checkout process, the main computer 10 recognizes that the checkout process is completed (S10: Yes), and then change the checkout completion flag to "1" (S11). Here, the checkout completion flag is associated with the one or more pieces of goods information and stored in the memory of the main computer 10.

Figure 4D:
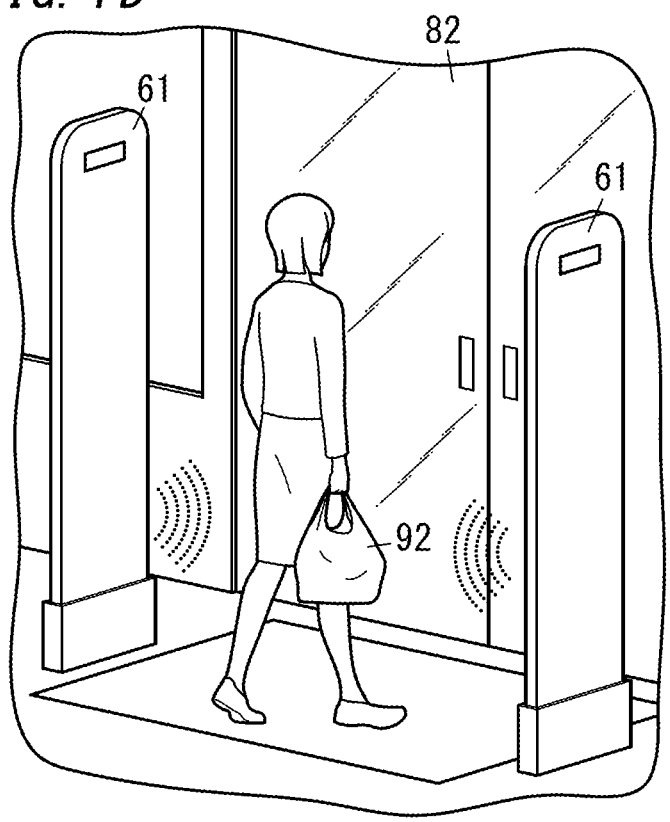
FIG. 4D is a view schematically illustrating a shopping act of a customer using the shopping assistance system.

Based on the checkout completion flag, it is to be determined whether or not a checkout process based on one or more pieces of goods information read from one or more electronic tags 93 through the gate devices 61 is performed. That is, as shown in FIG. 4D, when the customer 90 leaves the store 8 through the exit 82, the gate devices 61 communicate with one or more electronic tags 93 attached to one or more goods 91 in the container 92 held by the customer 90 in a contactless manner, respectively. In this case, whether or not a checkout process based on one or more pieces of goods information read from one or more electronic tags 93 through the gate devices 61 is completed is determined based on a value of the checkout completion flag associated with the one or more pieces of goods information that are stored in the memory of the main computer 10. That is, when the value of the checkout completion flag associated with the one or more pieces of goods information read from the one or more electronic tags 93 through the gate devices 61 is "1", it is determined that the checkout process for the one or more goods 91 is completed. The notification device 62 accordingly performs no notification process. On the other hand, when the value of the checkout completion flag associated with the one or more pieces of goods information read from the one or more electronic tags 93 through the gate devices 61 is "0", it is determined that the checkout process for the one or more goods 91 is not completed. The notification device 62 accordingly performs a notification process.

Here, the value of the checkout completion flag may be stored in not only the memory of the main computer 10 but also, for example, a server device connected to the shopping assistance system 100 via a network or a database provided in a cloud (cloud computing). In this case, whether or not a checkout process based on one or more pieces of goods information read from one or more electronic tags 93 through the gate devices 61 is completed is determined by access to, for example the database via the network by the shopping assistance system 100.

The shopping assistance system 100 may further cause the gate devices 61 to operate in tandem with an automatic door of the exit 82 to prohibit the automatic door of the exit 82 from opening when the checkout process based on one or more pieces of goods information read from one or more electronic tags 93 through the gate devices 61 is not completed.

Thus, the customer 90 just passes through the customer path 42 while moving goods 91 along the goods path 41, and thereby the shopping assistance system 100 enables the discrimination of the goods 91 to be purchased. The shopping assistance system 100 is therefore able to provide efficient shopping.

(3) Reference Example

Figure 7:
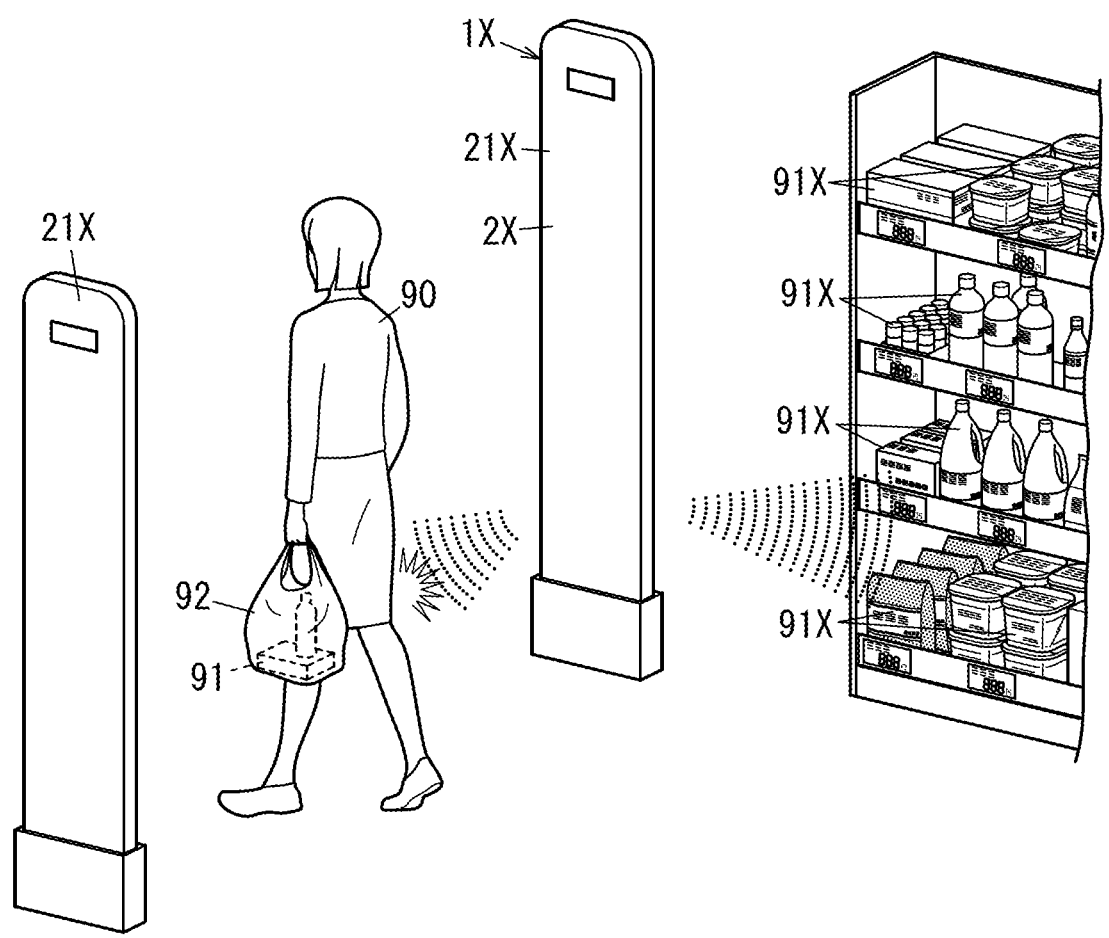
FIG. 7 is a perspective view illustrating a schematic configuration of a wireless reading system as a reference example.

FIG. 7 shows a wireless reading system 1X as a reference example. In the wireless reading system 1X, a reader device 2X includes two gate type of antennas 21X. The reader device 2X is configured to, when a customer 90 holding goods 91 passes between the two antennas 21X, read respective pieces of goods information of the goods 91 held by the customer 90. That is, in the wireless reading system 1X as the reference example, a customer path 42 which the customer 90 passes through and a goods path 41 which the goods 91 are moved along are not separately provided. The goods 91 are therefore moved between the two antennas 21X together with the customer 90. The shopping assistance system 100 according to the present embodiment is able to provide the load distribution system type of shopping style even if the wireless reading system 1X is applied.

However, there is a difference to be explained below between the wireless reading system 1X as the reference example and the wireless reading system 1 according to the present embodiment.

Specifically, in the wireless reading system 1X as the reference example, an obstacle moved between the two antennas 21X together with the goods 91 may hinder the respective pieces of goods information from being read. The "obstacle" stated in the present disclosure may be an object (including human body) to reduce respective received signal strength indications from corresponding electronic tags 93 in the reader device 2X, and needn't completely block radio waves. Specific examples of the obstacle include a person (including customer 90) passing between an antenna 21X and the goods (electronic tag 93), and belongings thereof (e.g., bag, purse, cellular phone and the like). The example of FIG. 7 schematically shows part of radio waves from one antenna 21X hitting the customer 90 to be blocked.

The wireless reading system 1X as the reference example requires, between the two antennas 21X, securing a space that allows at least a person (customer 90) to pass through. It is therefore necessary to set radio waves from each of the two antennas 21 to comparatively high radio transmission strength in order to cause radio waves from each of the two antennas 21 to be propagated throughout the space between the two antennas 21. Such high radio transmission strength is however to expand a communication area of the wireless reading system 1X. This consequently causes the reader device 2X to read respective pieces of goods information of, for example goods 91X other than goods 91 moved between the two antennas 21X. There is therefore a possibility that the goods 91X not to be purchased are detected as a target to be purchased in error. The example of FIG. 7 schematically shows that the reader device 2X reads respective pieces of goods information on goods 91X displayed near the reader device 2X.

In contrast, the wireless reading system 1 according to the present embodiment is able to reduce a possibility that the obstacle interrupts reading of the respective pieces of goods information because the customer 90 passes through the customer path 42 different from the goods path 41 along which goods 91 are moved. It is possible to reduce an area of a cross section of the goods path 41 perpendicular to an elongated direction thereof than that of the customer path 42 which the customer 90 passes through as long as just a space that allows goods 91 to pass through is secured in the goods path 41. This therefore makes it possible to set radio waves from each of the antennas 21 to comparatively low radio transmission strength and reduce the possibility that goods 91X other than goods 91 moved along the goods path 41 will be detected as a target to be purchased in error.

(4) Modified Examples

Embodiment 1 is merely one of various examples of the present disclosure. Embodiment 1 may be modified according to general arrangement and the like as long as an object of the present disclosure is achieved. Functions similar to the wireless reading system 1 may be realized by a wireless reading method, a (computer) program, a non-transitory medium storing the program, or the like. A wireless reading method according to one aspect possesses a movement step and a reading step. The movement step is a step of allowing one or more goods 91 held by a customer 90 passing through the customer path 42 to be moved along the goods path 41. The reading step is a step of, while the one or more goods 91 are moved along the goods path 41 in the movement step, performing wireless communicating, whose medium is radio waves, with one or more electronic tags 93 attached to the one or more goods 91, thereby reading one or more pieces goods information on the one or more goods 91, respectively.

Functions similar to the shopping assistance system 100 may be realized by a shopping assistance method, a (computer) program, a non-transitory medium storing the program, or the like. A shopping assistance method according to one aspect possesses a check-in step, a movement step, a reading step and a checkout step. The check-in step is a step of specifying a settlement source. The movement step is a step of allowing one or more goods 91 held by a customer 90 passing through the customer path 42 to be moved along the goods path 41 after the check-in step. The reading step is a step of, while the one or more goods 91 are moved along the goods path 41 in the movement step, performing wireless communicating, whose medium is radio waves, with one or more electronic tags 93 attached to the one or more goods 91, thereby reading one or more pieces goods information on the one or more goods 91, respectively. The checkout step is a step of performing checkout based on the settlement source that has been specified in the check-in step, and the one or more pieces goods information read through the reading step.

Applicable modified examples to be explained below may be appropriately combined.

(4.1) First Modified Example

As shown in FIGS. 8A to 8D, a wireless reading system as the present modified example is different in shape of housing from the wireless reading system 1 according to Embodiment 1.

Figure 8A:
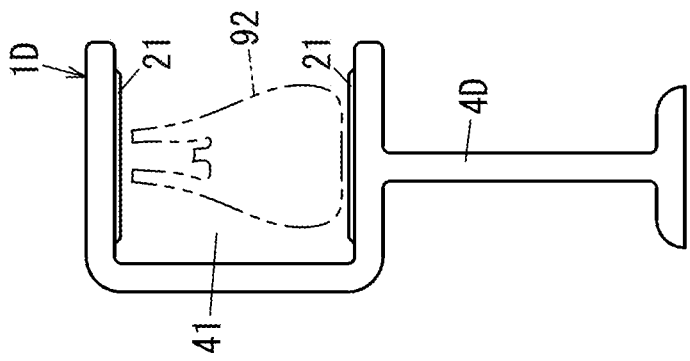
FIG. 8A is a front view illustrating part of a schematic configuration of a wireless reading system as a first modified example of Embodiment 1.

In a wireless reading system 1A shown in FIG. 8A, a housing 4A has a V-shaped cross-section that opens upward and is perpendicular to an elongated direction of a goods path 41 (direction along which goods 91 are moved). That is, the housing 4A has two side walls facing each other via a goods path 41 so that the side walls are inclined relative to a vertical direction with inner side surfaces thereof facing the goods path 41 directed diagonally upward.

Figure 8B:
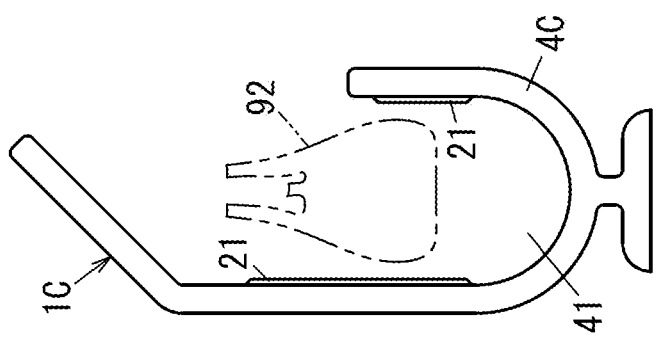
FIG. 8B is a front view illustrating part of a schematic configuration of a wireless reading system as the first modified example of Embodiment 1.

In a wireless reading system 1B shown in FIG. 8B, a housing 4B has a U-shaped cross-section that opens upward and is perpendicular to an elongated direction of a goods path 41. That is, the housing 4B has a curved bottom of the goods path 41.

Figure 8C:
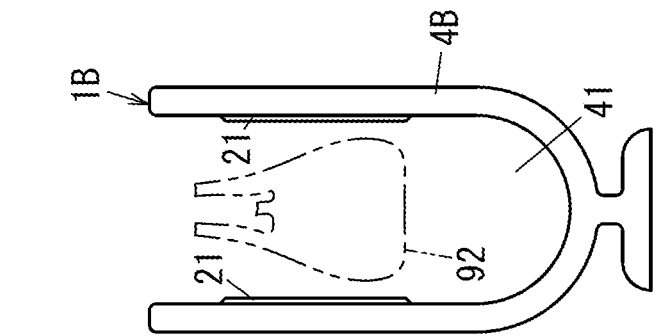
FIG. 8C is a front view illustrating part of a schematic configuration of a wireless reading system as the first modified example of Embodiment 1.

In a wireless reading system 1C shown in FIG. 8C, a housing 4C has a J-shaped cross-section that opens upward and is perpendicular to an elongated direction of a goods path 41. That is, the housing 4C has two side walls facing each other via a goods path 41 with their respective heights from a floor to their respective ends being different from each other. Here, a lower side wall is preferably located on a boundary between the goods path 41 and a customer path 42. In this configuration, a higher side wall function as a shield configured to shield radio waves, thereby enabling suppression of the leakage of radio waves from the goods path 41.

Figure 8D:
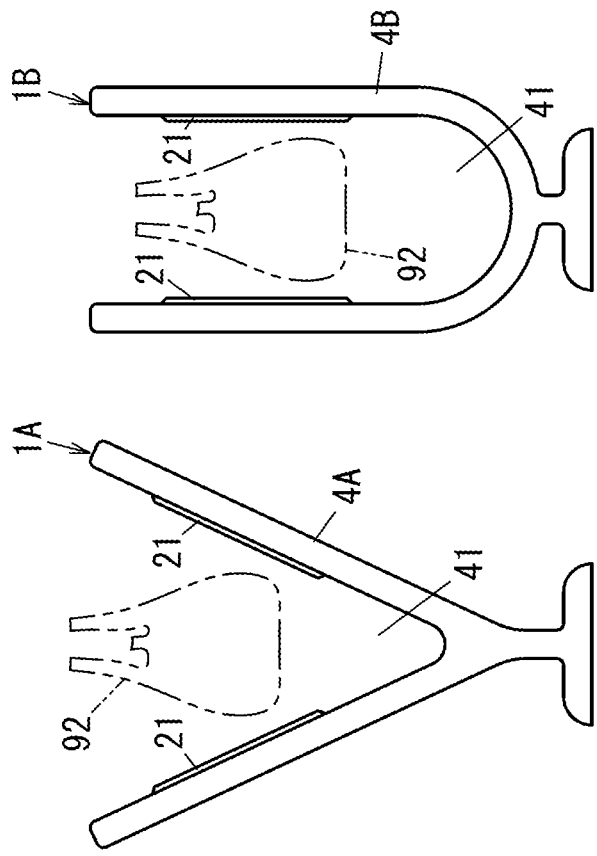
FIG. 8D is a front view illustrating part of a schematic configuration of a wireless reading system as the first modified example of Embodiment 1.

In a wireless reading system 1D shown in FIG. 8D, a housing 4D has a C-shaped cross-section that opens toward a customer path 42 and is perpendicular to an elongated direction of a goods path 41. That is, the housing 4D has two side walls facing each other via the goods path 41 with the side walls facing along a vertical direction.

Respective shapes of the housings shown in FIGS. 8A to 8D are merely examples. Such a wireless reading system may be provided with still another housing with a different shape.

(4.2) Second Modified Example

Figure 9A:
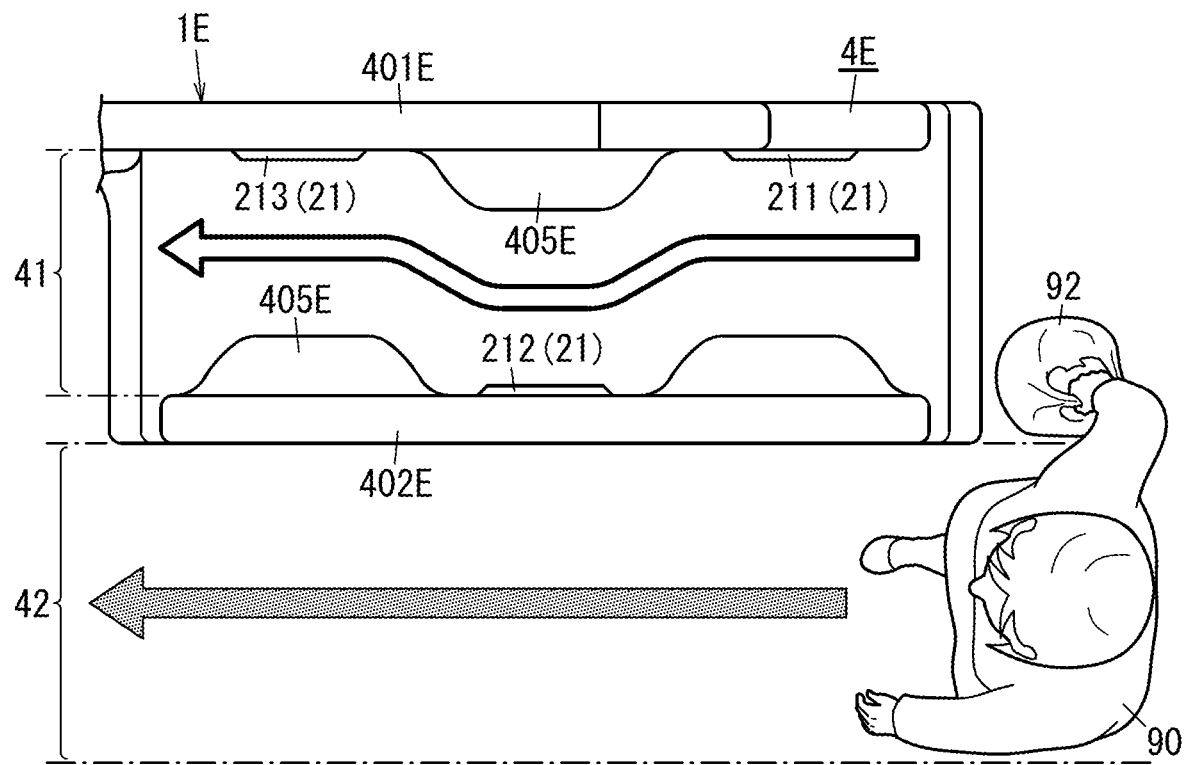
FIG. 9A is a plan view illustrating part of a schematic configuration of a wireless reading system as a second modified example of Embodiment 1.
Figure 9B:
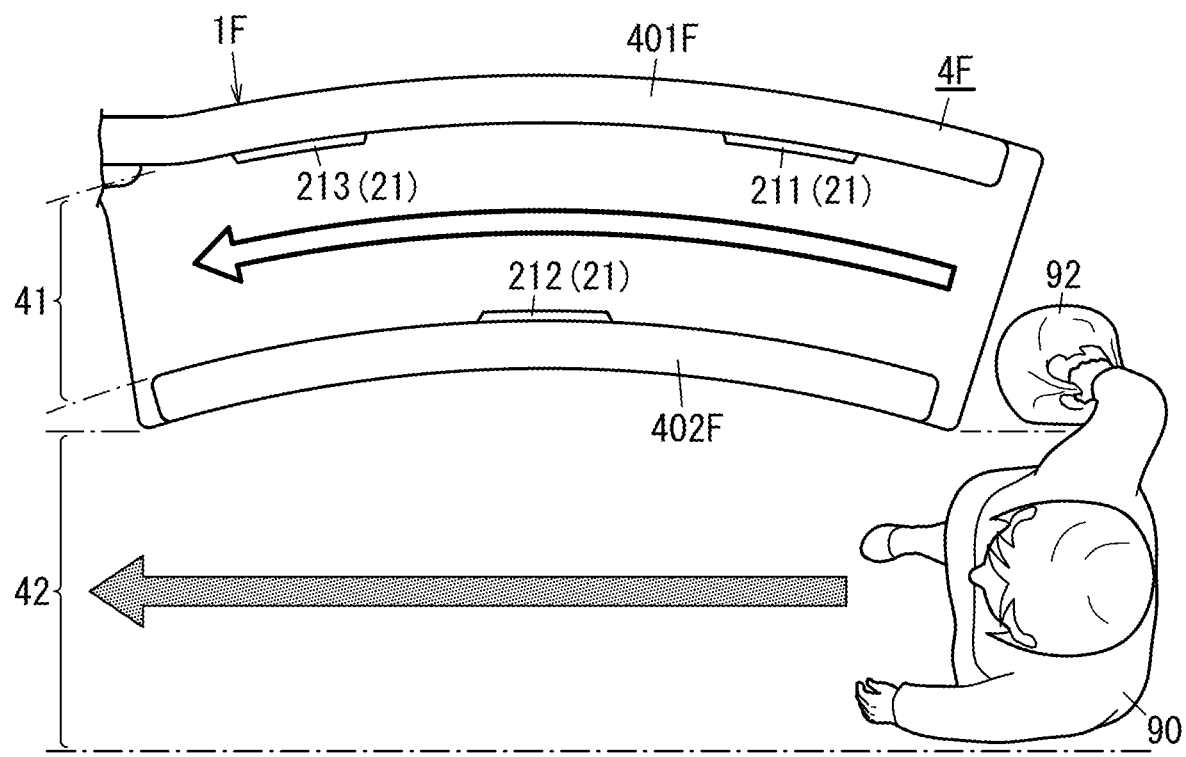
FIG. 9B is a plan view illustrating part of a schematic configuration of a wireless reading system as the second modified example of Embodiment 1.

In a wireless reading system as the present modified example, a shape of a goods path 41 in a plan view is different from that of the wireless reading system 1 according to Embodiment 1 as shown in FIGS. 9A and 9B. In each of FIGS. 9A and 9B, although respective movement paths of a customer 90 and goods 91 are depicted by respective arrows, the arrows are merely shown for explanation, and do not involve entities.

In a wireless reading system 1E shown in FIG. 9A, a housing 4E has a goods path 41 with a shape meandering relative to an elongated direction of a customer path 42 (direction along which customer 90 passes through). Specifically, the housing 4E possesses cushion members 405E protruding from inner surfaces of the goods path 41. Part of the cushion members 405E protrudes from a region of a first side wall 401E facing an antenna 212, and remaining part thereof protrude from respective regions of a second side wall facing antennas 211 and 213. With this configuration, a container 92 in which goods 91 are put comes into contact with the cushion members 405E while moved along the goods path 41, thereby enabling moving the goods 91 in the container 92. It is accordingly possible to cancel the overlapping state between electronic tags 93 of goods 91, the overlapping state between the electronic tag 93 of an item of goods 91 and metallic part of another item of the goods 91, or the overlapping state between an electronic tag(s) 93 and an identification tag 94. Certainty of reading one or more pieces of goods information from one or more electronic tags 93 is accordingly improved.

In a wireless reading system 1F shown in FIG. 9B, a housing 4F has a goods path 41 with a convex curved shape so as to be away from a customer path 42 in plan view. Specifically, each of first and second side walls 401F and 402F has a convex curved shape so as to be away from the customer path 42. With the configuration, a customer 90 gives turning force centered on a customer 90 to a container 92 moved along the goods path 41 to float the container 92 with centrifugal force, and is thereby able to easily lift goods 91 even when the goods 91 have relatively large weight.

(4.3) Third Modified Example

Figure 10A:
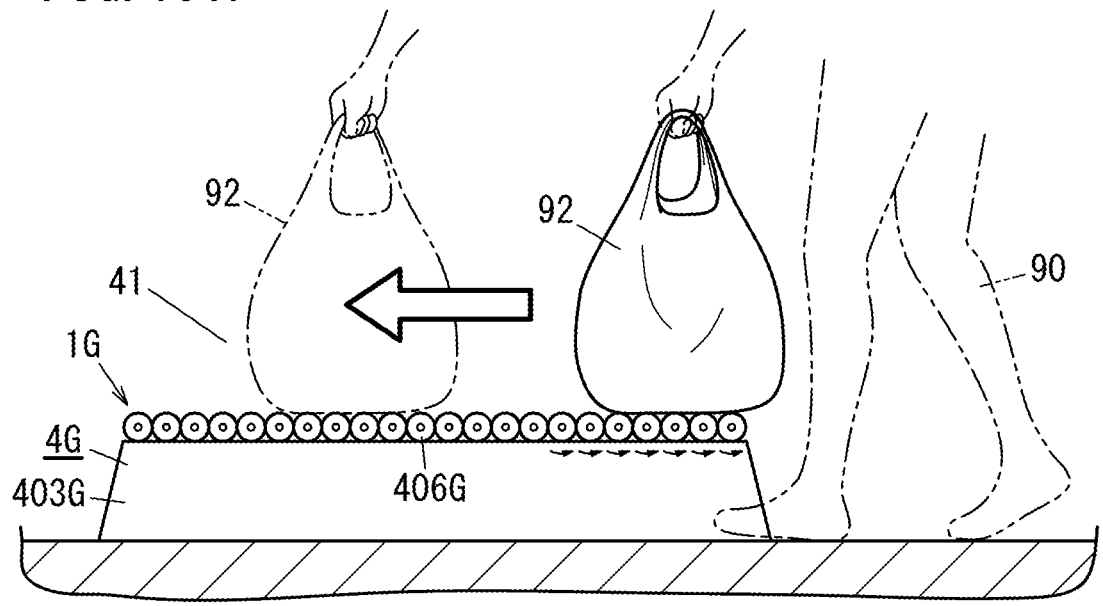
FIG. 10A is a side view illustrating part of a schematic configuration of a wireless reading system as a third modified example of Embodiment 1.
Figure 10B:
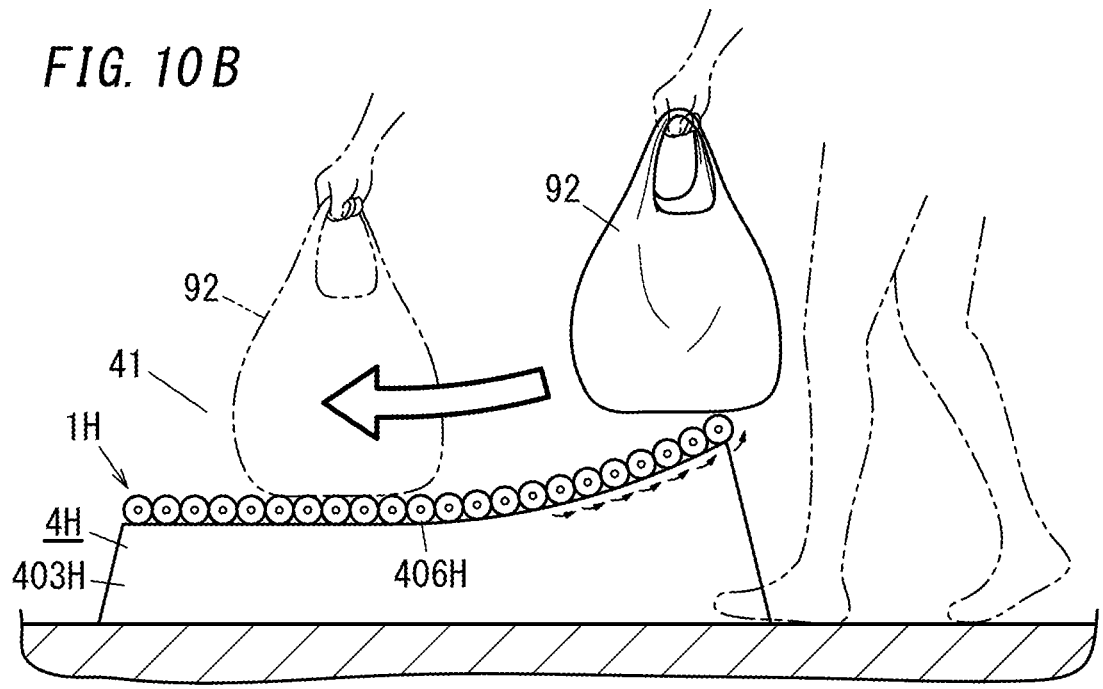
FIG. 10B is a side view illustrating part of a schematic configuration of a wireless reading system as the third modified example of Embodiment 1.

In a wireless reading system as the present modified example, a configuration of a bottom of a goods path 41 is different from that of the wireless reading system 1 according to Embodiment 1 as shown in FIGS. 10A and 10B. In each of FIGS. 10A and 10B, although a movement path of goods 91 is depicted by an arrow, each arrow is merely shown for explanation, and involves no entity.

In a wireless reading system 1G shown in FIG. 10A, a housing 4G has a bottom of a goods path 41 and the bottom is composed of rollers 406G. The rollers 406G are disposed side by side along a horizontal plane, thereby constituting the bottom of the goods path 41. The rollers 406G are disposed side by side in an elongated direction of the goods path 41 in a state where each of them is held by a linkage 403G in a rotatable manner. In this example, although the goods path 41 has no entity of the bottom, an imaginary surface on the rollers 406G corresponds to the bottom of the goods path 41 like a sliding surface of a roller slide. This enables each customer 90 to move goods 91 while sliding the goods 91 on the bottom of the goods path 41, thereby easily moving the goods 91 even when the goods 91 have relatively large weight.

In a wireless reading system 1H shown in FIG. 10B, a housing 4H has a bottom of a goods path 41 and the bottom is composed of rollers 406H and has a slope. Here, the bottom of the goods path 41 has the slope that becomes lower from an entrance area 411 to an exit 412 (see FIG. 5). In other words, an upper surface of a linkage 403H includes an inclined surface that is a surface inclined relative to a horizontal plane. This enables each customer 90 to, when moving goods 91 while sliding the goods on the bottom of the goods path 41, to easily move the goods 91 by the weight of the goods 91.

(4.4) Fourth Modified Example

Figure 11:
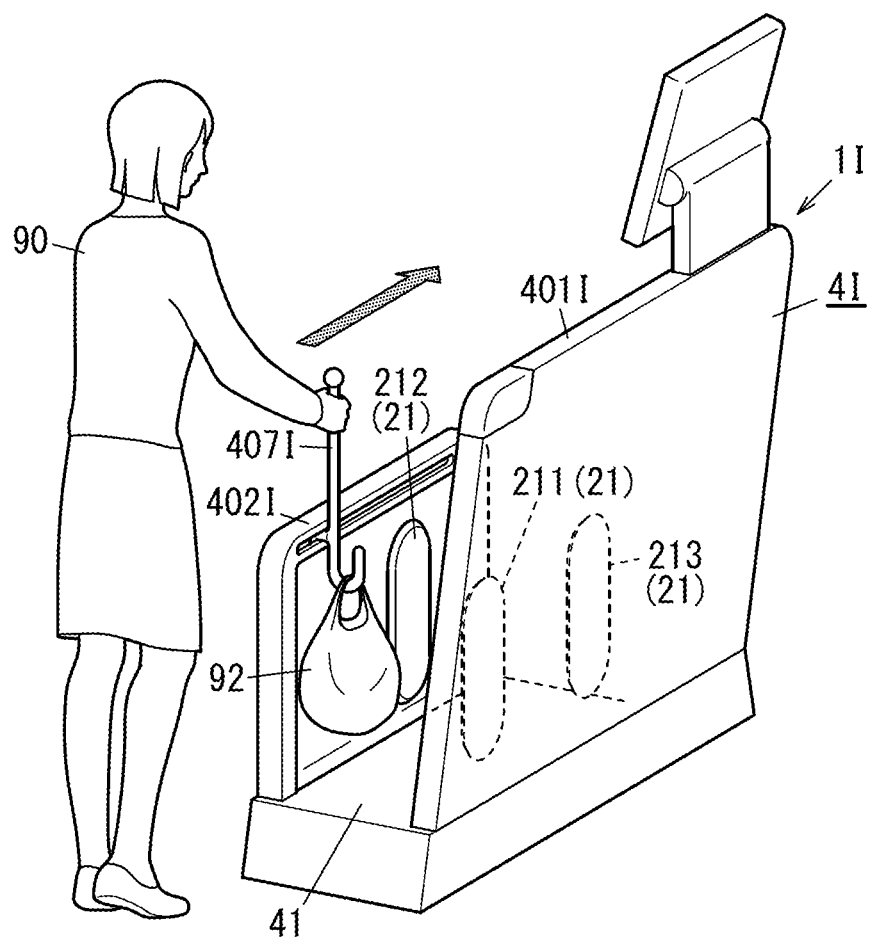
FIG. 11 is a perspective view illustrating a schematic configuration of a wireless reading system as a fourth modified example of Embodiment 1.

As shown in FIG. 11, a wireless reading system 1I as the fourth modified example further includes an auxiliary mechanism 407I. The auxiliary mechanism 407I is a mechanism configured to assist each customer 90 to hold goods 91. The example of FIG. 11 possesses a sliding hook. In FIG. 11, although a movement path of the auxiliary mechanism 407I (hook) is depicted by an arrow, the arrow is merely shown for explanation, and involves no entity.

With the auxiliary mechanism 407I, when a container 92 in which goods 91 are put is hung on the hook, the goods 91 hung on the hook are supported in a goods path 41. In this state, when the customer 90 holds a grip of the hook and then passes through a customer path 42 while sliding the hook (grip), the goods 91 are moved along the goods path 41 from an entrance area 411 to an exit 412 (see FIG. 5). Any one of first and second side walls 401I and 402I (in example of FIG. 11, second side wall 402I) is provided with the auxiliary mechanism 407I.

Therefore, the goods 91 indirectly held through the hook are moved along (pass through) the goods path 41 together with the customer 90 passing through the customer path 42. Thus, since the auxiliary mechanism 407I is provided so that the auxiliary mechanism receives a load of the goods 91, a burden on the customer 90 is able to be reduced. An easily available wireless reading system 1I is therefore provided for, e.g., a customer 90 with difficulty in walking using wheelchairs. The auxiliary mechanism 407I is not limited to the sliding hook. For example, the auxiliary mechanism may possess a sliding stage that allows goods 91 to be put on. The auxiliary mechanism 407I may possess a drive source configured to generate driving power (e.g., electric motor and the like) and be configured to transport goods 91 by the driving power.

(4.5) Other Modified Examples

Modified examples of Embodiment 1 other than the first to fourth modified examples will be described below.

In the shopping assistance system 100 according to the present disclosure, for example, the main computer 10 and the like include a computer system. A processor and a memory as hardware constitute a main configuration of the computer system. The processor executes a program stored in the memory of the computer system, thereby realizing the functions of the shopping assistance system 100 according to the present disclosure. The program may be stored in the memory of the computer system in advance, provided via a telecommunications network, or provided through a non-transitory computer (system) readable medium storing the program, such as a memory card, an optical disk, a hard disk drive or the like. The processor of the computer system is composed of one or more electronic circuits including a semiconductor integrated circuit (IC) or a large scale integrated (LSI) circuit. The electronic circuits may be integrated into one chip or provided in chips in a distributed manner. The chips may be integrated into one device or may be provided in devices in a distributed manner.

Functions of the shopping assistance system 100 being integrated into one housing is not essential for the shopping assistance system 100. Components of the shopping assistance system 100 may be provided in housings in a distributed manner. Examples of at least part of the functions of the shopping assistance system 100 may include a server device, cloud (cloud computing), and the like. To the contrary, in Embodiment 1, at least part of functions of the shopping assistance system 100 distributed in devices may be integrated into one housing.

The shopping assistance system 100 is not limited to being applied to a convenience store. The shopping assistance system 100 may be installed any store other than such a convenience store.

Examples of the electronic tags 93 may include not only passive RF tags but also active RF tags.

Examples of the container 92 that allows goods 91 to be put in may include not only a bag (plastic shopping bag) but also a basket, a bag, a box and the like.

Each customer 90 picking up (choosing) one or more goods 91 and putting (bagging) the one or more goods 91 in a container 92 at the same time is not essential for the shopping assistance system 100. For example, each customer 90 may pick up one or more goods 91 and subsequently put the one or more goods 91 in a container 92 until a checkout process is started, or the one or more goods 91 may be put in the container 92 after the checkout process. In this case, it may be unnecessary for each customer 90 to put one or more goods 91 in a container 92. For example, one or more containers 92 in each of which one or more goods 91 are put may be displayed in the shop 8, or one or more goods 91 may be automatically put in a container 92 through a bagging machine or the like.

The reader device 2 being provided with the antennas 21 is not essential for the wireless reading system 1. The reader device 2 may possess only one antenna 21. In case the reader device 2 possesses antennas 21, the number of the antennas 21 may be not only three but also two, or four or more. The arrangement of the antennas 21 may be not only the configuration shown in Embodiment 1 but also each of the first and second side walls 401 and 402 mat be provided with two or more antennas 21. Only one of the first and second side walls 401 and 402 may be provided with one or more antennas 21. Moreover, the bottom of the goods path 41 (upper surface of the linkage 403) may be provided with one or more antennas 21.

A surface of the housing 4 facing each antenna 21 may be provided with a reflection surface configured to reflect radio waves from a corresponding antenna 21. It is accordingly possible to reflect radio waves from each antenna 21 to effectively direct the radio waves toward one or more electronic tags 93 attached to one or more goods 91 in the goods path 41. The reflection surface preferably reflects the radio waves toward a side (in Embodiment 1, downward) opposite to an opening surface (in Embodiment 1, upper surface) of the goods path 41.

In Embodiment 1, the goods path 41 is positioned on the right side of each customer 90 passing through the customer path 42, but not limited to this. For example, the goods path 41 may be positioned on the left side of each customer 90 passing through the customer path 42.

The identification tags 94 being issued in respective check-in processes is not essential for the shopping assistance system 100. For example, the identification tags 94 may be activated, namely validated in respective check-in processes. The "activated (validated)" stated in the present disclosure means causing each identification tag 94 in a disable state for a checkout process to be in an enabled state for the checkout process. Examples of such activation to be realized include permitting the wireless reading system 1 to read identification information of each identification tag 94 storing the identification information, permitting usage of identification information for each checkout process, and writing identification information to each identification tag 94. In this case, each identification tag 94 may be substituted with a customer's personal digital assistant (smartphone, tablet computer or the like) or IC card.

The load distribution system type of shopping style being applied to the shopping assistance system 100 including the wireless reading system 1 and the checkout system 3 is not essential for the shopping assistance system 100. Specifically, a "load concentration system" type of shopping style in which customers 90 perform their own checkout operations in their respective checkout processes after one or more pieces of good information are read. When the load concentration system type of shopping style is applied, the check-in terminal device 5 is removed from the shopping assistance system 100. In this case, since checkout is performed after corresponding one or more pieces of good information are read, the wireless reading system 1 may be provided with a reader(s) (card reader(s)) configured to read, for example, a credit card, a prepaid card or electronic money. Especially, the card reader is preferably placed at the position of the housing 4 facing the customer path 42 such as the second side wall 402 on the boundary between the customer path 42 and the goods path 41.

The first and second side walls 401 and 402 vertically standing on the floor is not essential for the wireless reading system 1. For example, the first and second side walls 401 and 402 may be inclined relative to a vertical surface (plane perpendicular to the floor).

The reader device 2 is configured to respectively read one or more pieces of goods information from one or more electronic tags 93 attached to one or more goods 91 with the one or more goods 91 put in the container 92, but not limited to this. On or more pieces of goods information may be read from one or more electronic tags 93 of one or more goods 91 that are not put in the container 92. In this case, one or more goods 91 may be put or not put in the container 92 after the reader device 2 reads corresponding one or more pieces of goods information.

The main computer 10 being configured to communicate with the checkout system 3 is not essential for the shopping assistance system 100. The main computer 10 may not be possible to communicate with the checkout system 3. For example, the main computer 10 itself may have a function of performing a checkout process with respect to one or more goods 91 based on corresponding one or more pieces of goods information.

The shopping assistance system 100 may further include a writing device configured to write information to respective electronic tags 93 attached to goods 91. Specifically, the writing device may be included in the reader device 2 composed of a reader-writer configured to read and write data (information) from and to each electronic tag 93. As an example, the writing device writes checkout completion information, representing the checkout process of goods 91 to which electronic tags 93 are attached, to the electronic tags 93. In this case, the gate devices 61 may determine whether or not the checkout completion information is written to each electronic tag 93 and then cause the notification device 62 to perform a notification operation when the checkout completion information is not written thereto. When so called "kill tag" function is realized through the writing device, it is possible to verify that the checkout process has successfully been performed with respect to goods 91 to be taken out from the store even if the main computer 10 does not perform a process of causing the value of the checkout completion flag to be "1".

The trigger detector 64 is not essential for the shopping assistance system 100. For example, the main computer 10 may cause the determination unit 12 to start a determination process in response to a trigger—e.g., when the input device 32 receives a customer's (90) specific operation. That is, start timing of the determination process may be not only automatically determined with an object sensor or the like but also determined according to a customer's (90) operation.

Examples of each antenna 21 may include not only a circularly polarized antenna but also an elliptically polarized wave antenna, a linearly polarized wave antenna, and the like.

Embodiment 2

Figure 12:
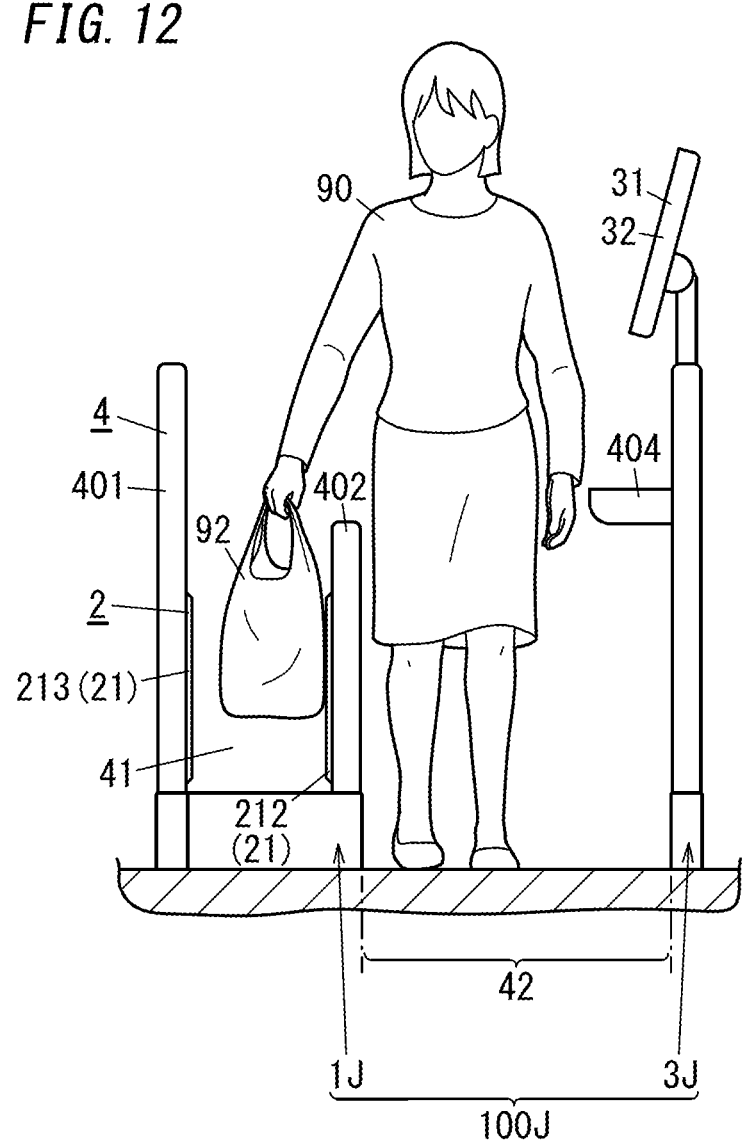
FIG. 12 is a front view illustrating a schematic configuration of a shopping assistance system according to Embodiment 2.

As shown in FIG. 12, in a shopping assistance system 100J according to the present embodiment, arrangement of an input device 32 of a checkout system 3J is different from that in the shopping assistance system 100 according to Embodiment 1. Hereinafter, identical constituent elements to those of Embodiment 1 have been allocated identical reference numerals, and description thereof has been omitted as appropriate.

The checkout system 3J according to the present embodiment possesses the input device 32 configured to receive a customer's (90) operation. The input device 32 is disposed at an opposite side of a customer path 42 from a goods path 41. In other words, the input device 32 is not provided on a housing 4 of a wireless reading system 1J but disposed to face the housing 4 of the wireless reading system 1J through the customer path 42. In short, the customer path 42 is disposed between the goods path 41 and the input device 32. Specifically, a display device 31 and the input device 32 of the checkout system 3J are integrated as a touch panel display and disposed in front of each customer 90 passing through the customer path 42, namely prior to an exit 412 of the goods path 41. The display device 31 and the input device 32 are disposed to face the customer path 42.

Therefore, if goods 91 have been moved along the goods path 41, the customer 90 reaches the front of the display device 31 and the input device 32. Moreover, the display device 31 and the input device 32 of the checkout system 3J are positioned on the left side of the customer 90 passing through the customer path 42. In the example of FIG. 12, the goods path 41 is positioned on the right side of the customer 90 passing through the customer path 42, while the checkout system 3J is positioned on the left side thereof. This therefore enables the customer 90 to operate the input device 32 by one hand (in FIG. 12, left hand) while holding goods 91 in another hand (in FIG. 12, right hand). It is accordingly possible to, without switching hand for holding the goods 91, operate the input device 32 to complete the checkout process while just passing through the customer path 42.

The configuration explained in Embodiment 2 may be applied in combination with various configurations (including modified examples) described in Embodiment 1 as appropriate.

Embodiment 3

A shopping assistance system 100 according to the present embodiment differs from the shopping assistance system 100 according to Embodiment 1 in that identification tags are integrated with containers 92, respectively. Hereinafter, identical constituent elements to those of Embodiment 1 have been allocated identical reference numerals, and description thereof has been omitted as appropriate.

In the shopping assistance system 100 according to the present embodiment, each identification tag 94 storing identification information associated with a settlement source is integrated with a container 92 that allows one or more goods 91 to be put in. In the present embodiment, examples of each container 92 include customer's (90) belongings without being provided when entering the store, such as a reusable shopping bag. For example, the identification tag 94 is sewn on the container 92 and thereby integrated therewith. The identification tag 94 integrated with the container 92 is therefore activated, namely validated in place of issuing the identification tag 94 in the check-in process.

This configuration enables simplification of the check-in terminal device 5 because the check-in terminal device 5 needn't issue identification tags 94. Moreover, the identification tag 94 can be reused with the container 92.

The configuration explained in Embodiment 3 may be applied in combination with various configurations (including modified examples) described in Embodiment 1 or 2 as appropriate.

(Brief)

As explained above, a wireless reading system (1, 1A to 1J) according to a first aspect includes a goods path (41) and a reader device (2). The goods path (41) allows one or more goods (91) held by a customer (90) passing through a customer path (42) to be moved along (pass through). The reader device (2) is configured to perform wireless communication, whose medium is radio waves, with one or more electronic tags (93) attached to the one or more goods (91) while the one or more goods (91) are moved along the goods path (41), thereby reading one or more pieces of goods information on the one or more goods (91), respectively.

With this aspect, while the customer (90) holding the one or more goods (91) passes through the customer path (42), the one or more goods (91) are moved along the goods path (41) and thereby the reader device (2) reads the one or more pieces of goods information on the one or more goods (91). Therefore, the reader device (2) reading the one or more pieces of goods information on the one or more goods (91) requires the customer (90) to just pass through the customer path (42) while holding the one or more goods (91). Therefore, the customer (90) performs an act of just passing in front of the reader device (2) without stopping in front of the reader device (2), thereby enabling the reader device (2) to read the one or more pieces of goods information. With the wireless reading system (1, 1A to 1J), it is consequently possible to reduce customer's (90) waiting time for purchase of the one or more goods (91).

In a wireless reading system (1, 1A to 1J) according to a second aspect turning on the first aspect, the goods path (41) is elongated along the customer path (42).

With this aspect, what is needed is to just move the one or more goods (91) along the goods path (41) elongated along the customer path (42). Therefore, while the customer (90) is passing through the customer path (42), the customer (90) needn't greatly change the distance between the customer (90) and the one or more goods (91). It is therefore possible to prevent the customer (90) from holding the one or more goods (91) in an awkward posture.

In a wireless reading system (1, 1A to 1J) according to a third aspect turning on the first or second aspect, the reader device (2) is configured to read the one or more pieces of goods information according to a result of detection by a customer detector (63) configured to detect movement of the customer (90).

With this aspect, it is possible to reduce the possibility that respective pieces of goods information will be read from goods other than a target to be purchased in error by reading the one or more pieces of goods information when there is, for example, a correlation between movement of the one or more goods (91) and the movement of the customer (90).

In a wireless reading system (1, 1A to 1J) according to a fourth aspect turning on any of the first to third aspects, the reader device (2) possesses antennas (212, 212, 213) each of which is configured to receive radio waves.

With this aspect, each of the antennas (212, 212, 213) receives radio waves, thereby enabling reduction in failure to read one or more pieces of goods information.

A wireless reading system (1, 1A to 1J) according to a fifth aspect turning on the fourth aspect further includes a discriminator (14). The discriminator (14) is configured to, when of the antennas (211, 212, 213), two or more antennas (21) receive radio waves, discriminate respective positions in order in which the two or more antennas (21) receive the radio waves. The antennas (211, 212, 213) are disposed side by side in a direction of the goods path (41) which the one or more goods (91) are moved along (or pass through).

With this aspect, it is possible to specify, from a result of discrimination by the discriminator (14), a direction which the one or more goods (91) are moved along, and reduce the possibility that respective pieces of goods information will be read from goods other than a target to be purchased in error.

A shopping assistance system (100, 100J) according to a sixth aspect includes a wireless reading system (1, 1A to 1J) according to any of the first to fifth aspects, and a checkout system (3, 3J) configured to perform a checkout process based on the one or more pieces goods information.

With this aspect, while the customer (90) holding the one or more goods (91) passes through the customer path (42), the one or more goods (91) are moved along the goods path (41) and thereby the reader device (2) reads the one or more pieces of goods information on the one or more goods (91). Therefore, the reader device (2) reading the one or more pieces of goods information on the one or more goods (91) requires the customer (90) to just pass through the customer path (42) while holding the one or more goods (91). Therefore, the customer (90) performs an act of just passing in front of the reader device (2) without stopping in front of the reader device (2), thereby enabling the reader device (2) to read the one or more pieces of goods information. With the wireless reading system (1, 1A to 1J), it is consequently possible to reduce customer's (90) waiting time for purchase of the one or more goods (91).

In a shopping assistance system (100, 100J) according to a seventh aspect turning on the sixth aspect, the checkout system (3, 3J) possesses an input device (32) configured to receive a customer's (90) operation. The reader device (2) and the input device (32) are provided in one housing (4, 4A to 4I).

With this aspect, the input device (32) of the checkout system (3, 3J) and the reader device (2) of the wireless reading system (1, 1A to 1J) have clear correspondence. This therefore enables the customer (90) to, for example when shopping assistance systems (100, 100J) are disposed side by side, easily understand which checkout system (3, 3J) of the shopping assistance systems (100, 100J) to be chosen in order to perform the checkout process.

In a shopping assistance system (100, 100J) according to an eighth aspect turning on the sixth aspect, the checkout system (3, 3J) possesses an input device (32) configured to receive a customer's (90) operation. The input device (32) is disposed at an opposite side of the customer path (42) from the goods path (41).

This aspect enables the customer (90) to operate the input device (32) by one hand while holding the one or more goods (91) in another hand. It is consequently possible for the customer (90) to, without switching hand for holding the one or more goods (91), operate the input device 32 to complete the checkout process while just passing through the customer path 42.

A shopping assistance system (100, 100J) according to a ninth aspect includes a wireless reading system (1, 1A to 1J, 1X) configured to read one or more pieces of goods information from one or more electronic tags (93) attached to one or more goods (91), respectively, and a checkout system (3, 3J) configured to perform a checkout process based on the one or more pieces of goods information. The shopping assistance system (100, 100J) causes the wireless reading system (1, 1A to 1J, 1X) to read the one or more pieces of goods information and identification information together from one or more electronic tags (93) attached to one or more goods (91) to be purchased, and an identification tag (94) storing the identification information associated with a settlement source. The checkout system (3, 3J) is configured to acquire the one or more pieces of goods information and the identification information from the wireless reading system (1, 1A to 1J, 1X) to perform the checkout process.

This aspect enables realization of a load distribution system type of shopping style that a burden on the customer (90) in the checkout process is distributed temporally. Thus, the burden on the customer (90) from reading of the one or more pieces of goods information though the wireless reading system (1, 1A to 1J, 1X) to the completion of the checkout process by the checkout system (3, 3J) is reduced. It is possible to more smoothly support customer's (90) shopping and consequently reduce customer's (90) waiting time for purchase of the one or more goods (91).

In a shopping assistance system (100, 100J) according to a tenth aspect turning on the ninth aspect, at least one of available time of the identification tag (94) and the number of times the identification tag (94) can be used for the checkout process is provided with a limit.

In a shopping assistance system (100, 100J) according to an eleventh aspect turning on the ninth or tenth aspect, the identification tag (94) is issued in a check-in process before the checkout process is started.

In a shopping assistance system (100, 100J) according to a twelfth aspect turning on the ninth or tenth aspect, the identification tag (94) is validated in a check-in process before the checkout process is started.

Each of the ninth to twelfth aspects can be implemented alone, and the premise of any of the first to eighth aspects is not essential. That is, in the shopping assistance system (100, 100J) according to the ninth aspect, for example, the wireless reading system 1X in which the reader device 2X includes the two gate type antennas 21X is also applicable as the reference example shown in FIG. 7.

Each of the first to eighth aspects can be implemented alone, and the premise of any of the ninth to twelfth aspects is not essential. That is, in the shopping assistance system (100, 100J) according to the sixth aspect, application of the load distribution system type of shopping style is not essential.

A wireless reading method according to a thirteenth aspect possesses a movement step and a reading step. The movement step is a step of allowing one or more goods (91) held by a customer (90) passing through a customer path (42) to be moved along (pass through) a goods path (41). The reading step is a step of, while the one or more goods (91) are moved along the goods path (41) in the movement step, performing wireless communicating, whose medium is radio waves, with one or more electronic tags (93) attached to the one or more goods (91), thereby reading one or more pieces goods information on the one or more goods (91), respectively.

A shopping assistance method according to a fourteenth aspect possesses a check-in step, a movement step, a reading step and a checkout step. The check-in step is a step of specifying a settlement source. The movement step is a step of allowing one or more goods (91) held by a customer (90) passing through a customer path (42) to be moved along a goods path (41) after the check-in step. The reading step is a step of, while the one or more goods (91) are moved along the goods path (41) in the movement step, performing wireless communication, whose medium is radio waves, with one or more electronic tags (93) attached to the one or more goods (91), thereby reading one or more pieces goods information on the one or more goods (91), respectively. The checkout step is a step of performing checkout based on the settlement source that has been specified in the check-in step, and the one or more pieces goods information read through the reading step.

Respective configurations of the second to fifth aspects may be omitted as appropriate and are not essential for the wireless reading system (1, 1A to 1J) according to the first aspect.

Respective configurations of the seventh and eighth aspects may be omitted as appropriate and are not essential for the shopping assistance system (100, 100J) according to the first aspect.

Respective configurations of the tenth to twelfth aspects may be omitted as appropriate and are not essential for the shopping assistance system (100, 100J) according to the ninth aspect.

Respective configurations of the ninth to fourteenth aspects may be omitted as appropriate and are not essential for the shopping assistance system (100, 100J) according to the sixth to eighth aspects.

The invention claimed is:

1. A wireless reading system, comprising
a customer path configured to allow a customer to pass therethrough;
a goods path formed next to the customer path, and configured to allow a shopping bag containing one or more goods held by the customer to pass therethrough, and
a reader device configured to perform wireless communication, whose medium is radio waves, with one or more electronic tags attached to the one or more goods while the shopping bag containing the one or more goods passes through the goods path, thereby reading one or more pieces of goods information on the one or more goods, respectively,
wherein the goods path comprises a side wall and a middle wall that divides the goods path from the customer path, wherein the middle wall and the side wall face each other with a space such that when the customer carrying the shopping bag walks through the customer path, the shopping bag passes through the goods path between the side wall and the middle wall.

2. The wireless reading system of claim 1, wherein the goods path is elongated along the customer path.

3. The wireless reading system of claim 1, wherein the reader device is configured to read the one or more pieces of goods information according to a result of detection by a customer detector configured to detect movement of the customer.

4. The wireless reading system of claim 1, wherein the reader device includes antennas each of which is configured to receive radio waves.

5. The wireless reading system of claim 1, further including a discriminator configured to, when of the antennas, two or more antennas receive radio waves, discriminate respective positions in order in which the two or more antennas receive the radio waves,
wherein the antennas are disposed side by side in a direction of the goods path which the one or more goods are moved along.

6. A shopping assistance system comprising
the wireless reading system of claim 1, and
a checkout system configured to perform a checkout process based on the one or more pieces goods information.

7. The shopping assistance system of claim 6, wherein the checkout system includes an input device configured to receive a customer's operation, and
the reader device and the input device are provided in one housing.

8. The shopping assistance system of claim 6, wherein the checkout system includes an input device configured to receive a customer's operation, and
the input device is disposed at an opposite side of the customer path from the goods path.

9. The shopping assistance system of claim 6, wherein the shopping assistance system causes the wireless reading system to read the one or more pieces of goods information and identification information together from one or more electronic tags attached to one or more goods to be purchased, and an identification tag storing the identification information associated with a settlement source, and
the checkout system is configured to acquire the one or more pieces of goods information and the identification information from the wireless reading system to perform the checkout process.

10. The shopping assistance system of claim 9, wherein at least one of available time of the identification tag and the number of times the identification tag can be used for the checkout process is provided with a limit.

11. The shopping assistance system of claim 9, wherein the identification tag is issued in a check-in process before the checkout process is started.

12. The shopping assistance system of claim 9, wherein the identification tag is validated in a check-in process before the checkout process is started.

13. The wireless reading system of claim 2, wherein the reader device is configured to read the one or more pieces of goods information according to a result of detection by a customer detector configured to detect movement of the customer.

14. The wireless reading system of claim 2, wherein the reader device includes antennas each of which is configured to receive radio waves.

15. The wireless reading system of claim 3, wherein the reader device includes antennas each of which is configured to receive radio waves.

16. The wireless reading system of claim 14, further including a discriminator configured to, when of the antennas, two or more antennas receive radio waves, discriminate respective positions in order in which the two or more antennas receive the radio waves, wherein the antennas are disposed side by side in a direction of the goods path which the one or more goods are moved along.

17. The wireless reading system of claim 15, further including a discriminator configured to, when of the antennas, two or more antennas receive radio waves, discriminate respective positions in order in which the two or more antennas receive the radio waves, wherein the antennas are disposed side by side in a direction of the goods path which the one or more goods are moved along.

18. A shopping assistance system comprising the wireless reading system of claim 2, and a checkout system configured to perform a checkout process based on the one or more pieces goods information.

\* \* \* \* \*